United States Patent [19]
Berku et al.

[11] Patent Number: 5,638,428
[45] Date of Patent: Jun. 10, 1997

[54] TELECOMMUNICATIONS MANAGEMENT AND CONTROL APPARATUS

[75] Inventors: Phillip Berku; Douglas Hartley, both of Dollard des Ormeaux; W. Robert Jeffcott; Kevin Orr, both of Pointe-Claire; Marcello Ruffolo, Montréal-Nord, all of Canada

[73] Assignee: Broadcast Holdings (CDN) Ltd., Quebec, Canada

[21] Appl. No.: 389,289

[22] Filed: Feb. 16, 1995

[51] Int. Cl.$^6$ .................................................. H04M 11/00
[52] U.S. Cl. ........................................ 379/100; 358/442
[58] Field of Search .......................... 379/100, 102, 379/104, 105, 92, 95, 106, 107; 358/400, 401, 402, 442

[56] References Cited

U.S. PATENT DOCUMENTS

| | | | |
|---|---|---|---|
| 4,965,676 | 10/1990 | Eijiri et al. | 358/406 |
| 4,994,926 | 2/1991 | Gordon et al. | 358/400 |
| 5,226,074 | 7/1993 | Han | 379/100 |
| 5,239,575 | 8/1993 | White et al. | 379/107 |
| 5,291,302 | 3/1994 | Gordon et al. | 358/400 |
| 5,321,741 | 6/1994 | Kaneko et al. | 379/100 |
| 5,367,564 | 11/1994 | Sutoh et al. | 379/100 |
| 5,394,458 | 2/1995 | Allen et al. | 379/100 |
| 5,479,500 | 12/1995 | Matsuzaki et al. | 379/100 |

*Primary Examiner*—Stella L. Woo
*Attorney, Agent, or Firm*—Wood, Phillips, VanSanten, Clark & Mortimer

[57] ABSTRACT

A data communication control apparatus for use in association with a facsimile transmission device, comprising: a memory for storage of telephone number data, private network protocol information and telephone line communicable data; an off-hook detector for determining when the facsimile device is placing an outgoing call; a controller for controlling the outgoing call in response to an instruction from the off-hook detector, the controller comparing the number of the outgoing call with the telephone number data in the memory and determining whether that number is served by the private network; and a fax-tone detector in association with the off-hook detector and memory for determining the time-out parameter of the facsimile device placing the outgoing call; wherein when the outgoing call is placed by the facsimile device, the off-hook detector instructs the controller which first determines whether or not the outgoing call is a long distance number and, if so, whether the long distance area code is serviced by the private network and, if so determined, the call is diverted to the said private network where if the call is not connected to the destination facsimile device within the time out period of the originating facsimile device, the call is diverted to the private network's store and forward facility.

6 Claims, 19 Drawing Sheets

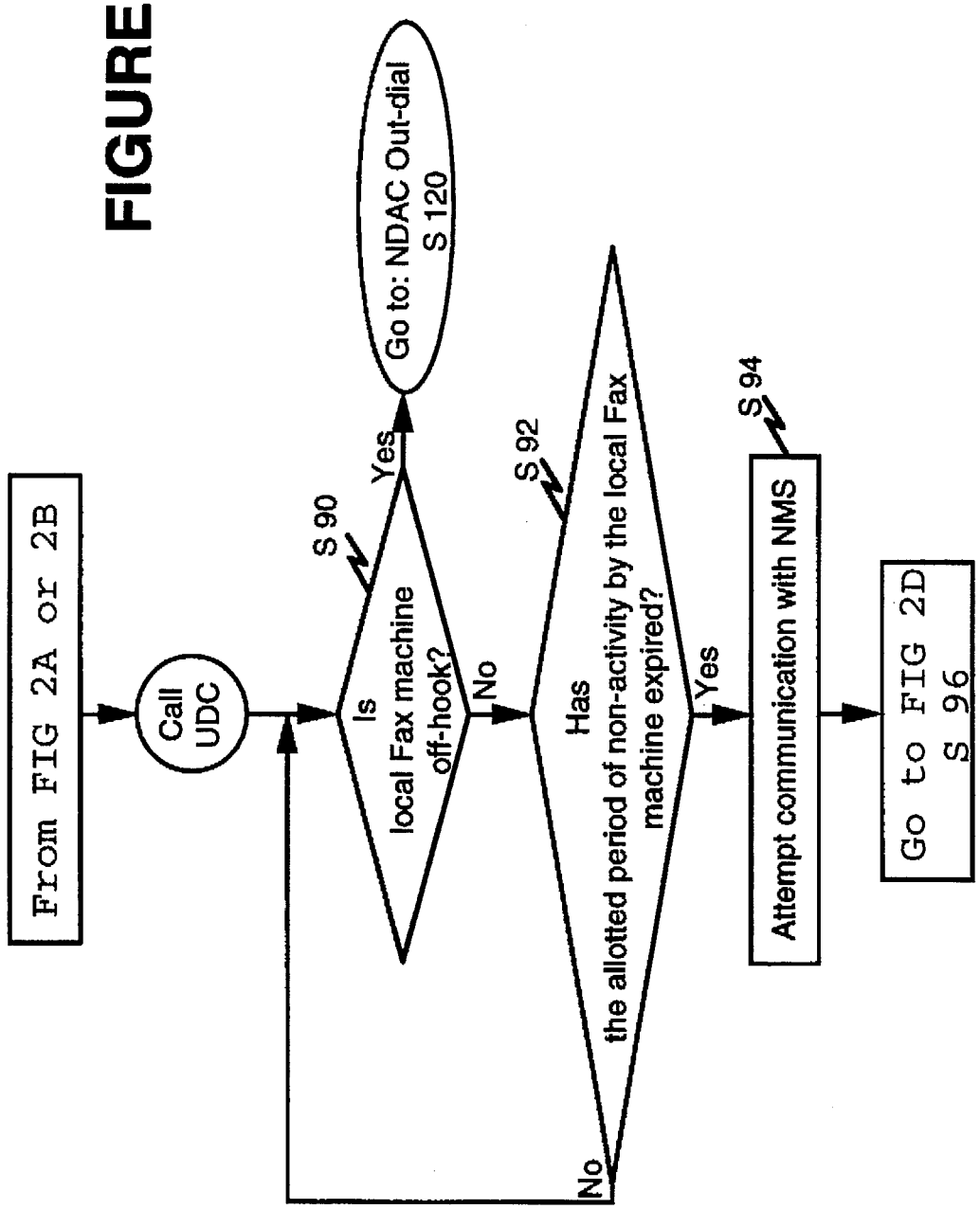

TELECOMMUNICATIONS MANAGEMENT AND CONTROL APPARATUS

BACKGROUND OF THE INVENTION

This invention relates to a telecommunications network management and control apparatus herein referred to as a Network Dial Access Controller (NDAC). In particular, it relates to a control apparatus for the selective diversion, routing and administration of originating facsimile calls to a common carrier's data transmission network, or what is referred to as a private network.

The CCITT/ITU X.39 facsimile transmission standard (X.39 protocol), as well as related standards, have a number of restrictive access characteristics. The present invention is capable of addressing these characteristics while essentially remaining in keeping with the appropriate standards.

Facsimile machines have a number of built-in time-out instructions designed to compensate for a variety of potential problems associated with the public telephone network. For example, a time-out function causes the originating facsimile machine to disconnect from the telephone network if it does not establish a successful connection with the destination facsimile machine within a fixed time period (typically between 30 seconds and 50 seconds). However, the call set-up process of the X.39 protocol itself may often exceed this time-out period, thus causing the originating facsimile machine to disconnect the call attempt before a connection is established. It is therefore advantageous to interpose a control apparatus between the originating and destination facsimile machine, or machines, to control the selective diversion, routing and administration of the outgoing call to, for example, a call store and forward facility.

It would also be advantageous for a service provider to be able to remotely test, interrogate, configure, program, or shut down the control apparatus for numerous reasons, such as to update routing tables, modify a user's options, update operating software, test and verify the apparatus, or disconnect the service. One type of the traditional control apparatus, known as a call diverter, has limited remote programming capability when a call is initiated by a remote programming device and there are presently no effective means to accomplish all of the aforementioned tasks without a technician physically attending at the user's premises. Other problems associated with call diverters are that their routing tables are limited in type and size due to memory constraints and they attempt to route calls to their associated private network even though that network, or a portion thereof, may not be functioning when the attempt is made.

The control apparatus of the present invention is attached between the calling device (usually a CCITT Group III facsimile machine or a personal computer equipped with a facsimile modem) and the Public Switched Telephone Network (PSTN). In particular, the control apparatus automatically controls the user's access to the private network and maintains statistics which assist the service provider to plan and optimize his network. Once in place it provides the following capabilities: (i) automatic network routing without user prompting; (ii) automatic determination of the initial time-out parameter (T1) characteristics of the attached originating facsimile machine; (iii) maintenance of configurable routing tables in a compressed format; (iv) implementation of a call home feature whereby the apparatus may initiate a call to an associated Uploading/Downloading Computer (UDC) and its associated NDAC management software, which together form an NDAC Management System (NMS) used for maintenance or instructions; (v) remote testing, interrogation, configuration, programming, temporary and permanent shut down of the apparatus initiated by the NDAC Management System (NMS); and (vi) tracking the condition of the associated private network and routing of the call.

In addition, other enhancements provided by the present apparatus include: (i) gathering of specified sets of statistics depicting the user's calling patterns (for subsequent downloading to the NMS; (ii) interface capability to third-party network equipment via configurable Dual Tone Multi-Frequency (DTMF) or other signalling techniques; (iii) local programming capabilities via an attached portable computer; and (iv) when connected to appropriately configured third-party network equipment, the control apparatus is capable of providing the following: (a) An indication of the integrity of the instructional data transmitted between it and the private network; (b) automatic forwarding of the user's User Identification Number (UID); (c) automatic forwarding of the user's Personal Identification Number (PIN); and (d) instructions to network equipment via a central node as to the type of service requested by the user (e.g. direct transmission in real-time, departmental billing, "broadcast" service, store-and-forward service, etc.).

SUMMARY OF THE INVENTION

It is an object of the present invention to provide a control apparatus which automatically determines, and then acts upon, the time out period of the originating facsimile machine by ordering network equipment to redirect the message to an associated store-and-forward facility just prior to the expiration of the T1 time-out period.

Another object of the present invention is to provide a control apparatus that is capable of determining either on its own, or through a "flag" that has been set on the network, that it needs to place a call to its associated UDC computer for maintenance and/or updating.

Another object of the present invention is to provide a control apparatus which can only be programmed after it has placed an outgoing call to the NMS for maintenance instructions to provide enhanced network security.

Another object of the present invention is to provide a control apparatus that, when connecting to appropriately configured network equipment, can detect the status of the network or a portion thereof and determine if the call that it is currently routing is destined for a location for which network facilities are temporarily not operational; it can then automatically route the call elsewhere if necessary.

Another object of the present invention is to provide a control apparatus capable of routing calls based on country codes and domestic area codes together with the first three digits of the telephone number, using a compression algorithm to maintain the routing tables in a minimal amount of memory.

BRIEF DESCRIPTION OF THE DRAWINGS

These and other advantages of the invention will become apparent upon reading the following detailed description and upon referring to the drawings in which:

FIGS. 2, 2A, 2B, 2C and 2D are a flow chart showing amongst others, the power-up sequence of the embodiment;

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The following is a detailed explanation of an embodiment of the present invention.

Figure 1:
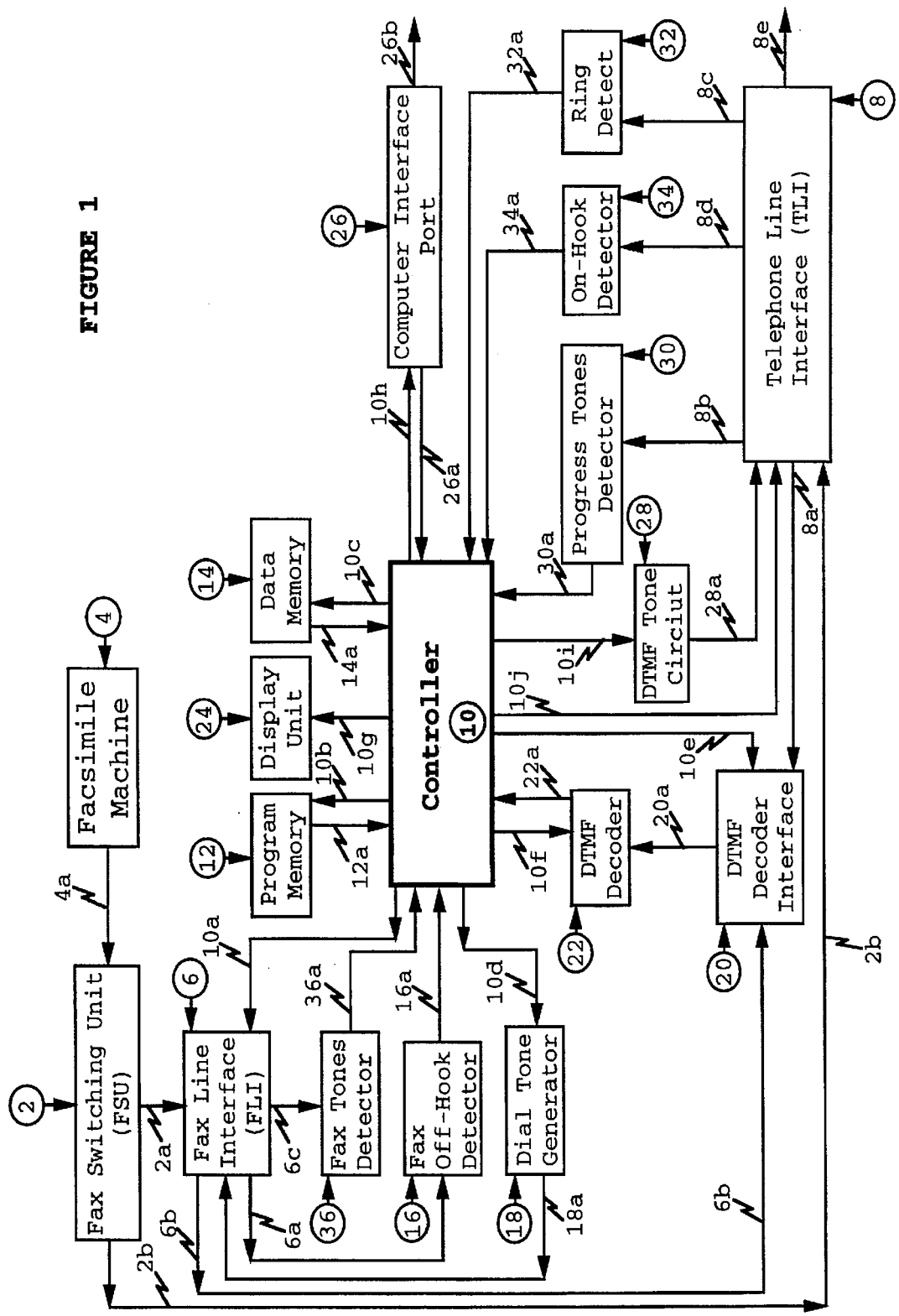
FIG. 1 is a block diagram showing the structure of one embodiment of the control apparatus of the present invention connected to a facsimile device.

In FIG. 1, the Fax-Switching-Unit (FSU) 2 of the control apparatus, connects a Group III or IV facsimile machine, or similar facsimile device 4 via its telephone jack, to either a simulated telephone line consisting of a Fax-Line-Interface (FLI) 6 or the PSTN, through Telephone-Line-Interface (TLI) 8. The FLI 6 supplies the required DC current and voltage to permit the facsimile 4 to operate as if connected to the standard PSTN. The TLI is used to switch the apparatus to the PSTN telephone line through line 8e for communication with a central node facility of a private network.

When the FSU 2 receives a control signal on line 10a, and if this signal has a logical "0" level, it then connects the facsimile 4 via line 2b to the TLI 8 and over line 8e to the PSTN. In case of a power failure affecting the apparatus, the system defaults to the logical "0" level, allowing the facsimile to communicate with the PSTN in the normal manner. If the control signal has a logical "1" level, the FSU connects the facsimile to the FLI 6, and associated blocks 16, 18 and 36. In the normal state, line 2a is connected to the FLI 6, permitting the control apparatus to intercept outgoing calls placed by the facsimile.

A control means, controller 10, consists of a microprocessor and memory chips, it executes operations as outlined below using programs stored in a memory means which consists of program-memory 12 and data memory 14. The program-memory 12 provides a non-volatile program storage medium and may be implemented in EPROM, ROM, EEPROM, RAM or other format and receives addressing and timing instructions from the controller on an addressing and control bus line 10b and returns the requested data on the data bus line 12a. Data-memory 14 of the memory means provides storage for system parameters such as tone frequencies, durations, telephone numbers, statistical records, and diagnostic and troubleshooting data. Again it may be implemented in EEPROM, NOVRAM, RAM or other suitable format so as to provide a non-volatile data storage medium that is re-programmable under external control and preferably by the apparatus itself as it operates. The data-memory receives addressing and timing instructions from the controller on the addressing and control bus line 10c and returns the requested data on the data bus line 14a.

When the facsimile device goes off-hook to place an outgoing call, a fax-off-hook-detector means 16 will detect a drop in voltage through line 6a at the FLI and signal to the controller 10 via line 16a. A dial-tone-generator 18 will then receive a digital signal from the controller on line 10d and convert it to a dial tone of suitable amplitude. Controller 10 responds to the aforementioned off-hook-detector signal with a dial tone frequency signal on line 10d applied to the dial-tone generator 18. A dial tone signal is applied via line 18a to the FLI. This signal propagates through line 2c routed through the FSU and over line 2a to the facsimile apparatus. Upon detecting the dial tone generated by the operation of the controller, the facsimile commences dialling.

A DTMF decoder interface 20 couples DTMF tones from either the facsimile or the TLI into a decoder means, DTMF decoder 22. It also blocks tones originating from the PSTN via the TLI, when the controller places a logical "1" on control line 10e. However, when the controller places a logical "0" on control line 10e, the DTMF decoder interface permits tones originating from the PSTN to propagate to the DTMF decoder. The DTMF decoder receives DTMF signals, at the correct amplitude range for reliable decoding, via line 20a from the DTMF decoder interface. DTMF dialling tones propagate from the facsimile via line 2a, through the FSU, via line 2c to the FLI via line 6b to the DTMF decoder interface, and then via line 20a to the DTMF decoder. DTMF dialling tones propagate from the telephone line 8e, through the TLI, via line 8a to the DTMF decoder interface and then via line 20a to the DTMF decoder. The DTMF decoder has a bi-directional link to transmit decoded tones to controller 10, shown by lines 10f and 22a. The decoded tones represent the dialled digits "0", "1", "2", and so on, including all of the 16 available DTMF digits. Should the facsimile dial in (rotary) pulse instead of DTMF, the fax-off-hook-detector will signal the make and break periods to the controller via line 16a to interpret the dialled digits.

Display unit 24 consists of a light emitting diode (LED) which signals the status of the system by its various states such as "OFF", "ON", "STEADY", "WINK", "SLOW-FLASH", or "FAST-FLASH". It is switched on by a "1" state and off by a "0" state applied to line 10g by the controller. Other suitable display means include, for example, a liquid crystal display, vacuum fluorescent display, or CRT.

A computer-interface-port 26 for the initial programming of the data-memory, provides serial connection via line 26a to a computer equipped with an RS-232C or similar serial port and an appropriate communications program. Optionally, this facility can be used to load the operating instructions into program-memory 12. Computer-interface-port 26 also permits uploading the data or program memory or a check sum value for verification purposes. The computer-interface-port obtains data to send from the controller on line 10h and passes received data to the controller via line 26a.

Dual Tone Multi-Frequency-Tone-Circuit (DTMF-Tone-CCT) 28 produces the tones required for dialling on the PSTN and for communications with the central node of the private network, according to digital signals on line 10i received from the from the controller. These tones are passed to the TLI on line 28a. The controller activates a line relay in the TLI by applying a level "1" on control line 10j, thereby permitting tones to be coupled to telephone line 8e by the TLI.

Progress-tones-detector 30 receives a sampling of incoming analog signals from the TLI via line 8b and converts them to digital pulses which are then fed on line 30a to the controller for analysis. The controller's program stored in program memory 12 enables it to recognize from the pulses the PSTN's call progress tones that are required for proper operation, such as dial tone and busy tone. The progress-tones-detector will also enable the controller to recognize the Called Station Identification (CED) signal from a remote facsimile machine or similar equipment.

A ring-detect circuit 32, which is connected to the TLI through line 8c, converts the voltage and frequency of the ringing signal, that originates from the PSTN via line 8e, to a digital signal that is used to alert the controller of an incoming call via line 32a.

On-hook-detector 34 monitors the voltage of telephone line 8e, via line 8d, from the TLI. When this voltage increases from the low off hook value to the high level of an open telephone line, the on-hook-detector is triggered and signals the controller, via a logical "0" applied to line 34a, indicating that the facsimile has terminated the call. According to its operating program, the controller then sends a logical "0" level signal on line 10a to the FSU thus switching the facsimile to the FLI.

Fax-tones-detector 36 is connected to the FLI by line 6c. When the FSU has been set to switch the facsimile to the FLI, it converts any tones produced by the facsimile apparatus to digital pulse equivalents, as is done by the progress-tones-detector. The digital pulse equivalent signals are sent to the controller for analysis on line 36a. Using the memory means the controller's program enables it to recognize from these pulses the signals from the facsimile that are required for determining the state and timing conditions for the facsimile, for example the Calling Station Identification (CNG) tone of the originating facsimile. In use, the digit string entered by the user on the facsimile's keypad (or attached telephone set) typically includes the destination telephone number and may optionally include additional digits to indicate the type of service desired.

When the facsimile goes off-hook, it will detect the dial tone and dial the number string in the normal manner. Dial tone is provided by the dial-tone-generator 18 after detection of the off-hook condition by the off-hook-detector 16. DTMF decoder 22 or off-hook-detector 16, together with the controller 10, will then decode the numbers dialled in DTMF or pulse dialling, respectively. To minimize loss of time which could be a critical factor in avoiding T1 time-out, the controller instructs the TLI 8 to go off-hook on the PSTN side and test for dial tone using progress-tones-detector 30. The telephone number field is analyzed (as will be described below) to determine if the call should be placed through the network by dialling the central node, or through the PSTN. Statistics on the number of calls placed to each area, and other aspects of operation, are kept in buffers in data-memory 14, for subsequent retrieval by the UDC.

Using its program and stored data, the controller determines whether the destination telephone number dialled by the facsimile is not only long distance or local subscriber's choice, but also in an area served by the network. If all requirements are met, the call will then be considered as a network call. Otherwise, it will be considered to be a PSTN call, and the dialled telephone number will be retrieved from controller's RAM memory, and redialled to the PSTN.

Whether the call is determined to be for the network or the PSTN, the PSTN line will be available for immediate dialling since the control apparatus earlier went off-hook and checked for a dial tone. If the number dialled tested as acceptable for a network call, the central node telephone number will now be dialled, and communication will be established between the control apparatus and the node.

Communication starts with a "status handshake" tone from the node which serves as a prompt to send data and, at the same time, indicates to the calling control apparatus if network facilities are fully operational. The number string originally entered, minus any fields used for local instructions to the PSTN, are then re-dialled to the node. Check digits are appended to enable the node to confirm that it has correctly received all of the digits sent. Confirmation of acceptance of the data is given by an acknowledgement in the form of a network instruction tone ("Kiss Off") from the node. This "Kiss Off" tone also indicates the status of the control apparatus Call Home (NCH) flag, described below. In the case of unsatisfactory data reception, the "Kiss Off" tone will be withheld (or optionally the 'Prompt' tone will be reissued). This serves as a signal for the apparatus to re-transmit the data one more time. Only in the exceptional situation that satisfactory data communication is not established by the second round, will the communication be terminated. This is accomplished by the apparatus and node both switching to the on-hook state.

Normally, after successful data communications, connection to the PSTN line is maintained to controller 10, through the TLI and progress-tones-detector so that the CED tone from the destination facsimile can be detected. While the control apparatus waits, the node will route the call over the network to the remote node closest to the destination facsimile (or to the store-and-forward facility as appropriate). The remote node calls the destination facsimile apparatus using the local PSTN. The destination facsimile answers the call, if not busy, and produces a CED tone according to standard T30 facsimile protocols. This CED signal is detected by the network, re-produced at the node and sent over the PSTN line to the calling control apparatus. When CED tone is detected, the controller switches the FSU and TLI concurrently. The facsimile apparatus is now connected directly to the PSTN line, which is still maintained to the node. The controller's side of the TLI is switched to the on-hook high impedance state.

On initial power-up activation, the controller performs an automatic measurement of the specific T1 Time-out value of the user's facsimile apparatus. If the CED is not detected within a programmable period before the T1 time-out, the controller sends a DTMF "Divert to Store-and-Forward" command to the node. A programmable duration is allotted to permit the node the required time to divert the call to store-and-forward facilities. The T1 parameter is measured using the controller's internal timer, which measures the time period from the first CNG tone emitted by the facsimile to the time the facsimile goes back On-hook after having timed-out. The CNG tone is signalled to the controller by the Fax tones detector. The On-hook condition of the facsimile is signalled to the controller by the Off-hook detector. The T1 time-out period, once measured, is stored in the data memory 14 of the memory means of the controller 10.

When the facsimile is not active generating an outgoing call, the system is able to monitor for an incoming call and to simultaneously detect the next outgoing call dialled. The ring voltage from a PSTN incoming call alerts the controller and it then immediately instructs the FSU to switch the facsimile from the simulated phone line to the PSTN line. The ring voltage from the PSTN is connected to the facsimile, which can then detect it, go off-hook and receive the incoming call in the same manner as if the facsimile apparatus was connected directly to the PSTN.

In local programming mode the control apparatus can be programmed and data retrieved by a computer connected to the interface port. Controller 10 detects the connection and operates from a separate program stored in its program-memory 12 according to its local programming mode. A Graphical User Interface, template files and specialized routines, facilitate the functions of retrieving the relevant data stored in the control apparatus' memory, checking its validity, and downloading revised data. The programming computer is also capable of verifying and changing one or more portions of the stored programs in program-memory 12.

In remote programming, the control apparatus can be programmed and data retrieved remotely over the PSTN by the UDC. The control apparatus enters UDC mode when so instructed by receipt of a special "Kiss Off" tone which sets the NCH flag or when the data buffers used to store statistics reach a preset percentage of maximum capacity. Remote programming mode cannot be entered in any other way, as a safeguard against unauthorized access or tampering. To minimize interference with normal facsimile usage, a configurable period of inactivity is required before the control apparatus will use the PSTN line for communication with its UDC. Once this period has elapsed, the controller signals the TLI to go off-hook on the PSTN side. Controller 10 then detects dial tone using progress-tones-detector 30 and then dials a separate UDC telephone number using DTMF-tone-CCT 28. When the UDC modem answers the call, the controller generates modem tones, using the DTMF-Tone-CCT. The controller receives modem tones from the UDC modem through progress-tones-detector, using a program stored in program-memory 12. The UDC runs a program specifically written for this purpose which can either operate unmanned or under the control of an operator. A Graphical User Interface, template files, and specialized routines, facilitate the functions of uploading data stored in the control apparatus, checking its validity, and downloading revised data. The UDC is also capable of verifying and changing one or more portions of the stored programs in the program memory, as well as turning the control apparatus 'ON', or 'OFF' remotely.

FIGS. 2, 3, 4 and 5 show the flow of the control program stored in program-memory 12.

In step S38, the controller initializes its internal memory and loads essential parameters and data stored in non-volatile data-memory 14.

In step S40, the facsimile is switched by a level "1" on line 10a to the standby condition and is connected to the FLI. Concurrently, the TLI is switched by a level "0" on line 10j to the on-hook condition.

To determine if the program for local programming and uploading should be run, step S42 checks whether or not a connection is present at computer-interface-port 26. If a connection is found, in step S44 the controller will fetch the serial communication program stored in program memory 12 and operate according to this software's instructions until released by the local programming computer. If a connection is not present, the controller will continue to step S46 and execute a standard control apparatus program.

Step S46 checks whether a start-up mode is occurring (as a result of an AC power failure for example) by comparing specific memory locations in the controller's RAM, and corresponding specific values in the program memory 12. If it is occurring, flow proceeds to step S48. If not, flow advances to step S50.

Step S48 clears the T1 parameter and forces the last digit of the UID number to "9". It is unaffected by a department number that the user may have entered for this first call.

Step S50 judges whether a permanent shut-down mode has been previously established. If the permanent shut-down mode is in effect, step S52 turns off the LED indicator.

In step S54 the facsimile is switched by a level "0" on line 10a to the TLI, thereby switching it directly to the PSTN line 8e. If the permanent shut-down mode is not in effect, flow advances to step S56 which then judges whether a temporary shut-down condition exists. If it is in effect, flow diverts to step S72. If it is not, flow advances to step S58.

Step S58 judges whether the facsimile apparatus has just gone off-hook. If it has, the program flow advances to step S120. If facsimile was judged not off-hook in step S58, step S60 turns the LED indicator ON.

Step S62 judges whether an NCH flag has been set to request a call to the UDC. If no, the program flow advances to step S64. If yes, the program flow proceeds to step S68.

Step S64 judges whether any statistics buffers in the data memory 14 are more than 80% full (i.e. configurable). If yes, program flow proceeds to step S66. If not, program flow returns to step S58 and checks again whether the facsimile has just gone off-hook.

Step S66 determines whether any statistics buffers of data-memory 14 are more than 90% full. If yes, the program flow advances to step S68. If not, the program flow moves to step S70.

Step S68 sets up a counter timer to check for 5 minutes of non-activity by the facsimile. Flow then advances to step S90.

Step S70 sets up a counter timer to check for 3 hours of non-activity by the facsimile. Flow then proceeds to step S90.

Step S72 turns the LED indicator off if the temporary shut-down mode is in effect. Next, step S74 judges whether the facsimile has just gone off-hook. If not, flow loops back to step S164. If yes step S76 provides a simulated dial tone to the facsimile from the dial tone generator through the FLI and the FSU. The number dialled by the facsimile is stored in the controller's RAM memory for comparison with the NDAC Unlocking Code (NUC) stored in data-memory 14.

Step S78 judges if the correct NUC has been entered into the facsimile by the user. If yes, flow advances to step S80 to clear the NUC. If not, flow proceeds to step S84. At step S82, flow advances without a time delay to step S90. There, a call is immediately placed by the control apparatus to the UDC to report that the user has entered the correct NUC, and to obtain authorization to reset to normal functionality. This call provides the second key of a dual key system which uniquely permits secure remote disabling of the control apparatus function.

In Step S84 the controller switches the TLI off-hook on the PSTN line 8e. Controller 10 then detects a dial tone and re-dials the digits just dialled by the facsimile. After dialling, the FSU switches the facsimile to the PSTN line. Concurrently, the TLI disconnects DTMF-Tone-CCT from the PSTN.

Step S86 monitors the PSTN line via the on-hook-detector 34. When the facsimile goes on-hook to terminate its call, the controller disconnects from the PSTN by switching the facsimile via the FSU back to the standby FLI connection.

After Step S68, S70 or S82, flow proceeds to step S90. However, before the control apparatus prepares to place a call to the UDC, it first determines through step S90 if the facsimile has just gone off-hook. If yes, the program flow advances to step S120. During the connection attempt with the UDC's control apparatus' software (or network management software) and prior to the "Go-ahead", if the control apparatus identifies an off-hook condition from the facsimile it immediately terminates its connection attempt with the UDC and resets to process the call. If not, the controller continues to step S92.

Step S92 judges whether the allotted time period of the facsimile's inactivity, set earlier by step S68, S70, or S84, has expired. If it has, flow advances to step S94. If it has not, the program flow loops back to step S90, and will remain in the loop consisting of steps S90 and S92 until the required period of non-activity has expired or until the facsimile apparatus goes off-hook.

Step S94 places a call to the UDC telephone number stored in the data memory 14.

Flow advances to step S96 to cause the LED indicator to "Wink" which indicates that a call to the UDC is being placed.

Step S98 judges if communication with the UDC has been successfully established within a pre-set time limit. If it has, flow proceeds to step S100. If not, flow proceeds to step S114.

Step S100 judges if the call was placed because of the reception of an NUC, which, in step S82, set a flag requesting resetting of the control apparatus' temporary shut-down mode. If yes, step S102 will inform the UDC's network management software of that fact. If not, flow advances to step S108.

Step S104 judges whether the unlocking of the control apparatus is indeed authorized. If it is, flow proceeds to step S40 at the beginning of the program to perform the off-hook reset functions and re-start normal operation. If not, flow proceeds to step S106.

Step S106 programs a new NUC. This new NUC can be later entered by the user if necessary and validated according to the just described program flow. This unlocking procedure just described will be repeated, if at a future time the same control apparatus has been forced by the UDC to the temporary shut-down state again.

In the step S108, data and program maintenance functions are performed. These include uploading of statistics, routing tables and programmed parameters, and then selective reprogramming of routing tables and programmable parameters, if required.

Step S110 judges if the call was fully successful in reaching the end of the maintenance with all data having been validated. If yes, flow proceeds first to step S112. If not, flow returns directly to step S40 for an on-hook reset.

In the step S112, the NCH flag is set to negative. Next, flow proceeds to step S40 at the beginning of the program to perform the off-hook reset functions and restart normal operation.

Step S114 determines if the communication failure, determined in step S98, is due to the fact that all PSTN lines to the UDC were busy. If judged busy, flow proceeds to step S116. If not, flow proceeds to step S118.

In the step 116, the "UDC Busy" counter is incremented by one (1). Flow then proceeds to re-start at step S40.

In step 118, the "Failure to Communicate with UDC" counter is incremented by one (1). Flow then proceeds to re-start at step S40.

In the step S120, a simulated dial tone is provided to the facsimile by the dial-tone-generator 18 through the FLI and the FSU.

Step S122 sets the LED indicator to "FLASH" at the fast rate.

In step S124, the digits dialled by the facsimile are decoded by the DTMF decoder and stored in the controller's RAM memory.

In step S126, the controller asserts a level "1" on the control line 10j to switch the TLI off-hook on the PSTN line 8e. Detection of dial tone on the PSTN is carried out at the same time as the facsimile dialled digits are being received and decoded. This is accomplished using multi-tasking program techniques.

Step S128 judges whether dialling was performed automatically by the facsimile or dialled manually by the user, by checking whether the dialling cadence is constant. If yes, flow proceeds to step S130. If not, flow proceeds to step S132.

Step S130 waits 0.2 seconds after each digit for the next digit to start, before ending the number sequence capture. Flow then proceeds to step S134.

Step S132 waits 3.0 seconds after each digit for the next digit to start, before ending the number sequence capture. Flow then proceeds to step S134.

Step S134 judges if the facsimile's T1 parameter has already been captured. If yes, flow proceeds to step S136. If no, the controller diverts to step S170.

Step S136 judges if a type of service was detected in the number sequence dialled by the facsimile. If yes, flow advances to step S142. If not, flow proceeds to step S138.

Step S138 judges if a CNG tone has been detected from the facsimile. If yes, flow proceeds to step S140. If not, flow advances to step S142.

Step S140 starts the T1 timer so that a "Divert-to-Store-and-Forward" command can be issued to the node when the facsimile's T1 time has nearly expired.

Step S142 judges if the first dialled digit captured in step S124 is an asterisk (*). If yes, flow proceeds to step S144, otherwise, to step S146.

Step S144 sets up the next two (2) digits for accessing some special PSTN features, such as *70 to disable call waiting when dialling onto the PSTN.

Step S146 judges if the first (fourth) dialled digit captured in step S124 is a "0". If yes, flow proceeds to step S150, otherwise, to step S148.

Step S148 judges if the first (fourth) dialled digit captured in step S124 is a "1". If yes, flow proceeds to step S194, otherwise, to step S210.

Step S150 judges if the next dialled digit (the digit following the first "0") captured in step S124 is a "1". If yes, flow proceeds to step S152. If not, to step S210.

Step S152 judges if the next dialled digit captured in step S124 is also a "1". If yes, flow proceeds to step S154. If not, to step S210.

Step S154 judges if the next 1, 2 or 3 digits following the digit tested in step S152, represent a valid country code. If yes, flow proceeds to step S156. If not, flow proceeds to step S162.

Step S156 judges if the valid country code is enabled, meaning that the call should be passed to the network. If yes, flow proceeds to step S220. If not, flow continues to step S158.

Step S158 judges if the current call is the result of a re-dial attempt. If yes, flow proceeds to step S162. If not, flow proceeds to step S160.

In step S160, the specific "Country Code Not Yet Served" counter, corresponding to the Country Code determined in step S154, is incremented by one (1). Flow then proceeds to step S162.

Step S162 judges if the number sequence captured in step S124 included a type of service. If yes, the call is treated as invalid and flow returns to step S216. If not, flow advances to place a PSTN carried call at step S210.

Step S164 checks for a ringing voltage on the PSTN which signals the presence of an incoming call. If ringing is detected, flow proceeds to step S166. If ringing is not detected, flow loops back to step S74.

In step S166 the FSU is switched by a level "0" on line 10a to the "ON PSTN" condition with the facsimile connected to the TLI. PSTN ringing voltage is applied to the facsimile, providing it with a signal indicating that there is an incoming call to be answered. On detecting the ringing signal, the facsimile will go off-hook to answer the call in its normal manner.

Step S168 judges if and when the facsimile has terminated the call and has gone back on-hook. If it has gone back on-hook, flow proceeds to step S40 to restart. If not, flow loops back to step S168 to continue checking for the on-hook condition.

In the capture of T1, Step S170 turns the LED indicator on in "FAST FLASH" mode.

Step S172 judges if a CNG tone has been detected within 5 seconds from the facsimile. If yes, flow proceeds to step S174. If not, flow then diverts to step S186.

Step S174 starts the measurement of the T1 parameter using the controller's internal timer and RAM.

Step S176 waits until fax-off-hook-detector signals the controller, on line 16a, that the facsimile has timed out and gone back on-hook.

Step S178 stops the measurement of the T1 parameter.

Step S180 judges if the T1 parameter value obtained is less than 30 seconds. If yes, flow proceeds to step S184. If not, flow proceeds to step S182.

Figure 2:
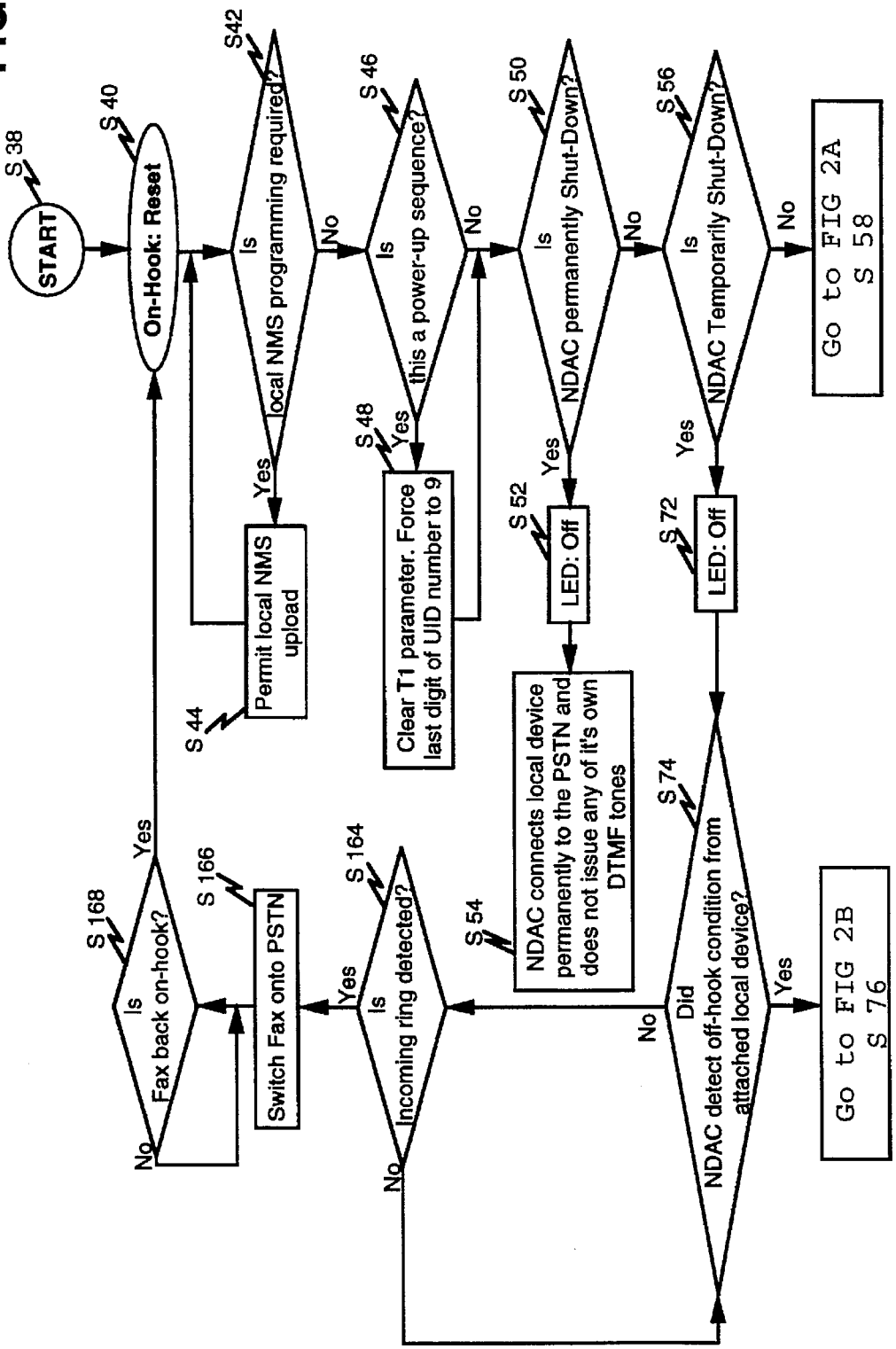
Figure 2A:
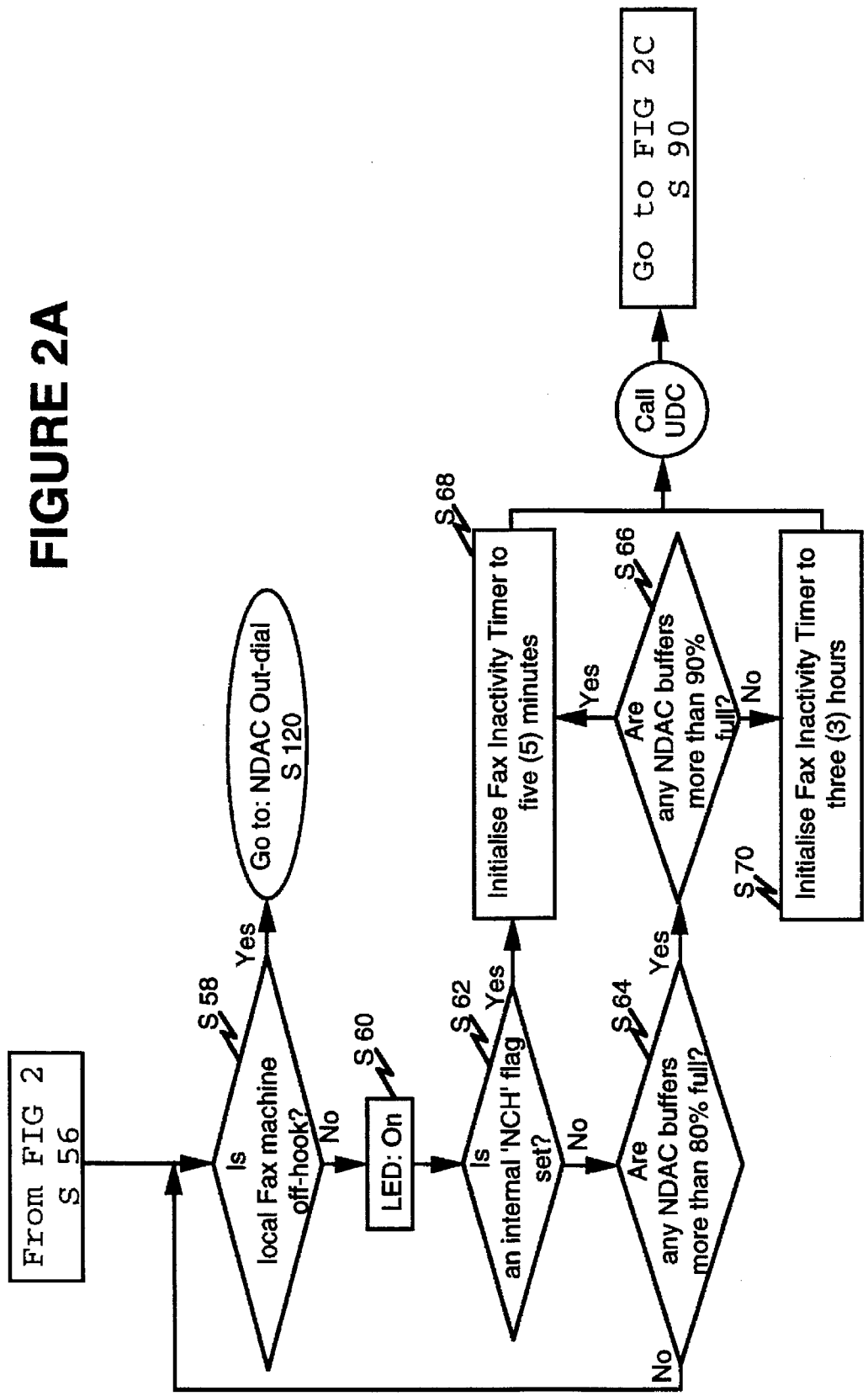
Figure 2B:
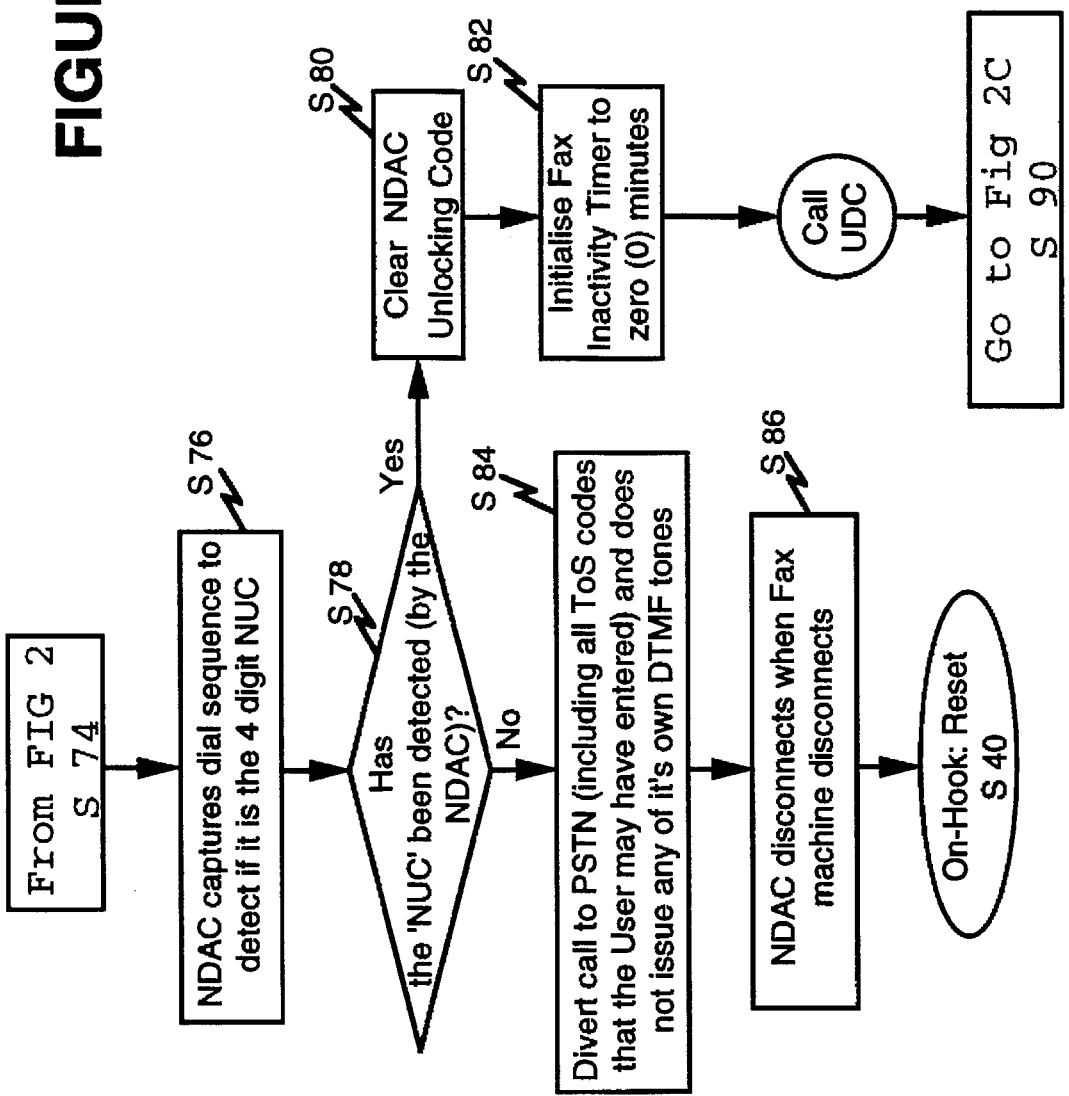
Figure 2D:
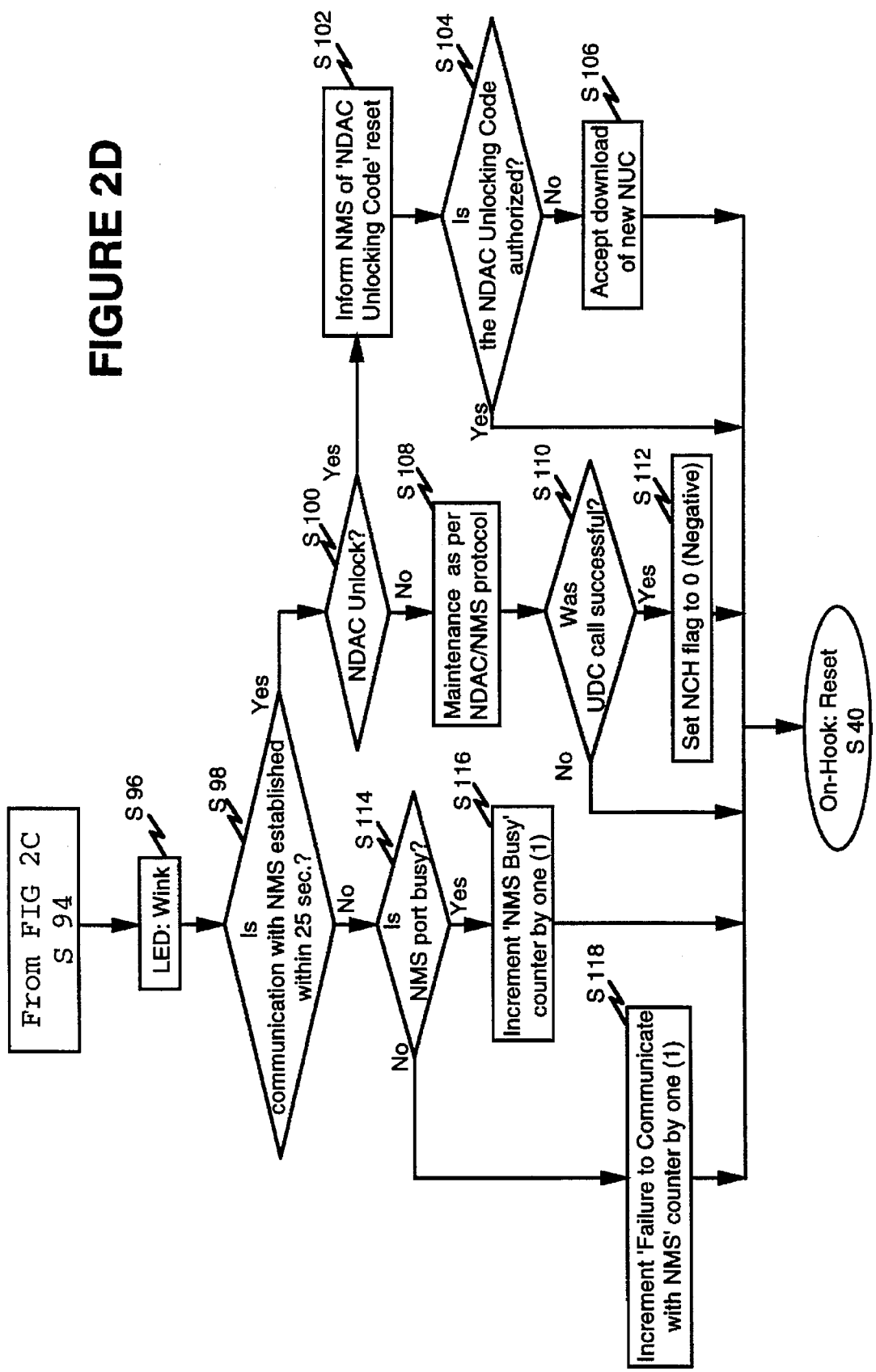
Figure 3:
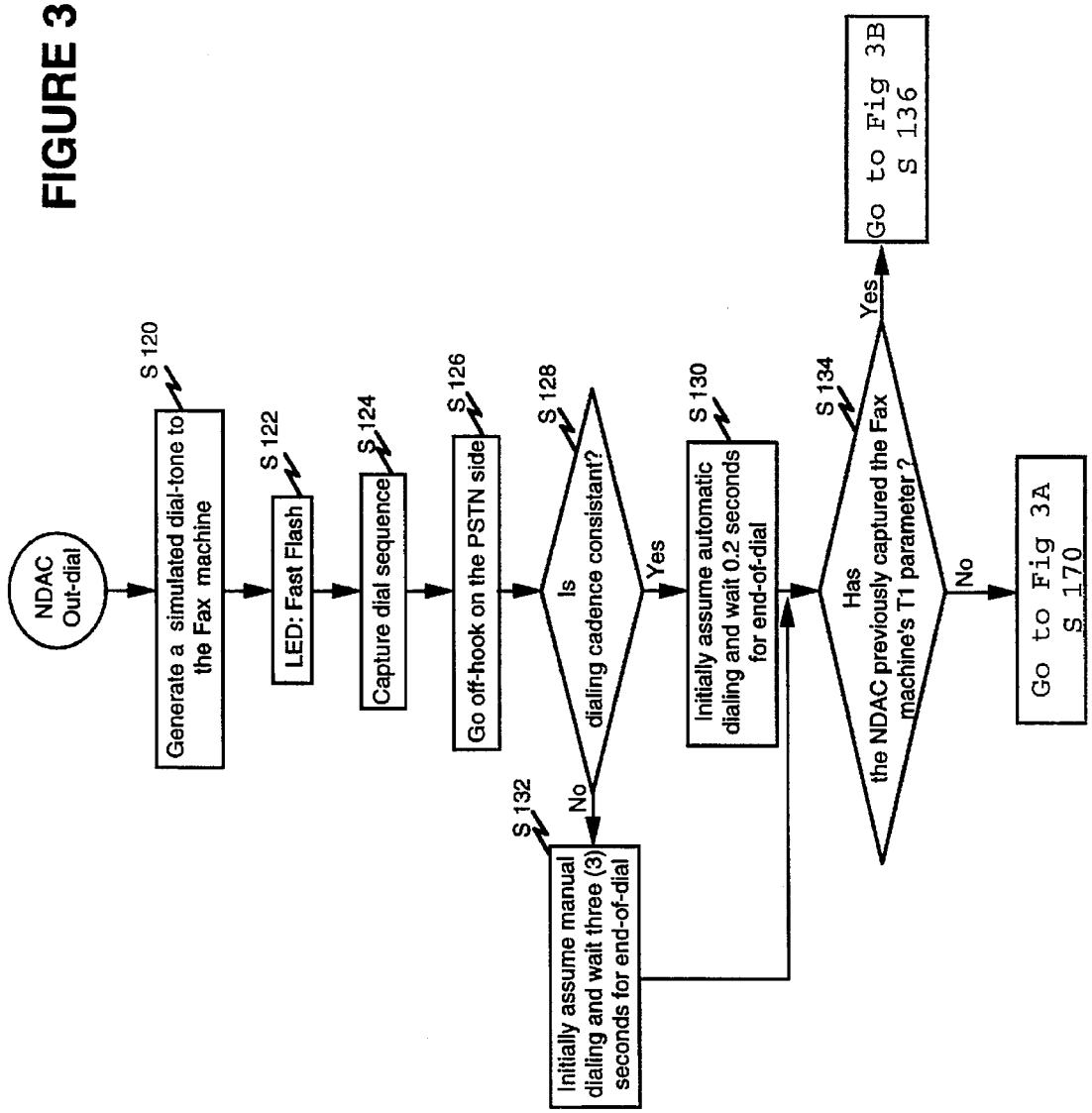
FIGS. 3, 3A, 3B, and 3C are a flow chart showing amongst others, the verification of control apparatus T1 parameter measurements.
Figure 3A:
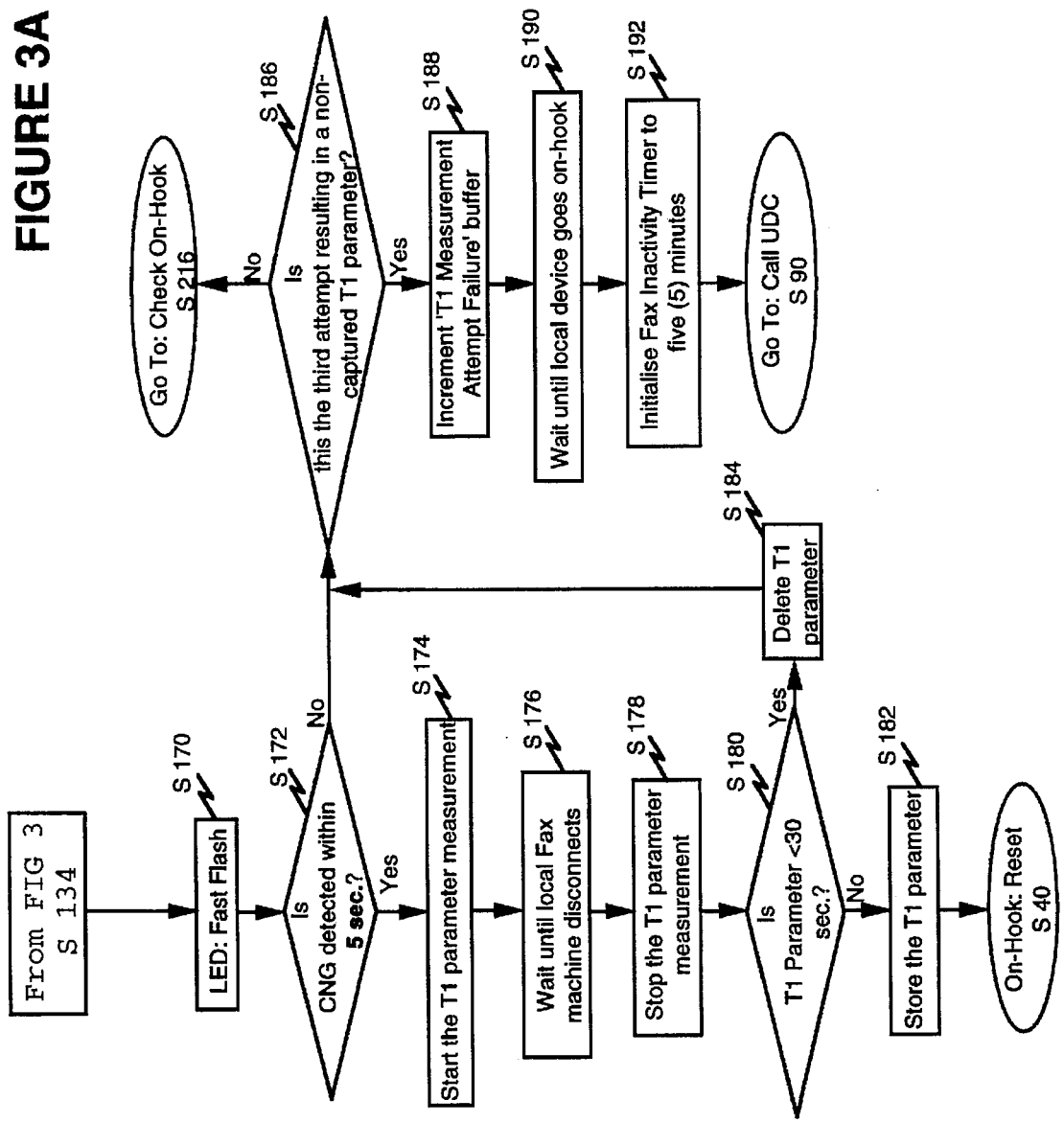
Figure 3B:
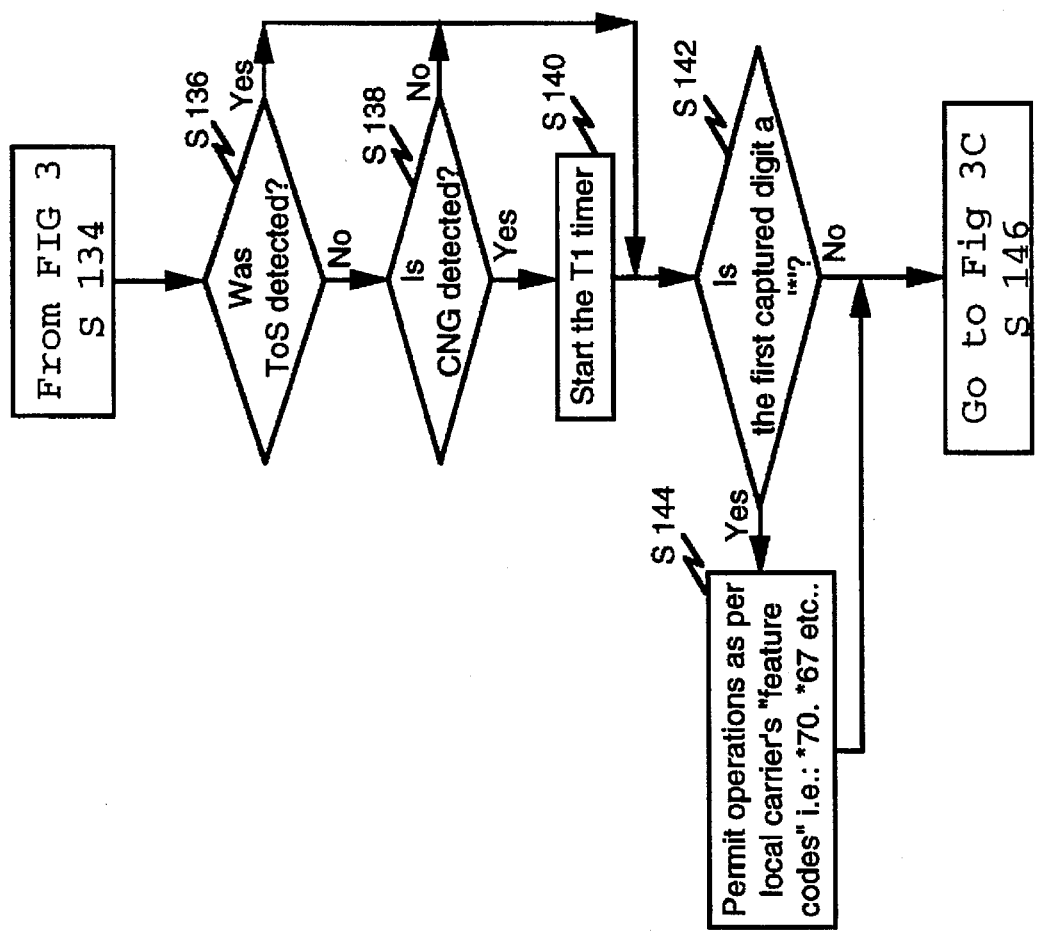
Figure 3C:
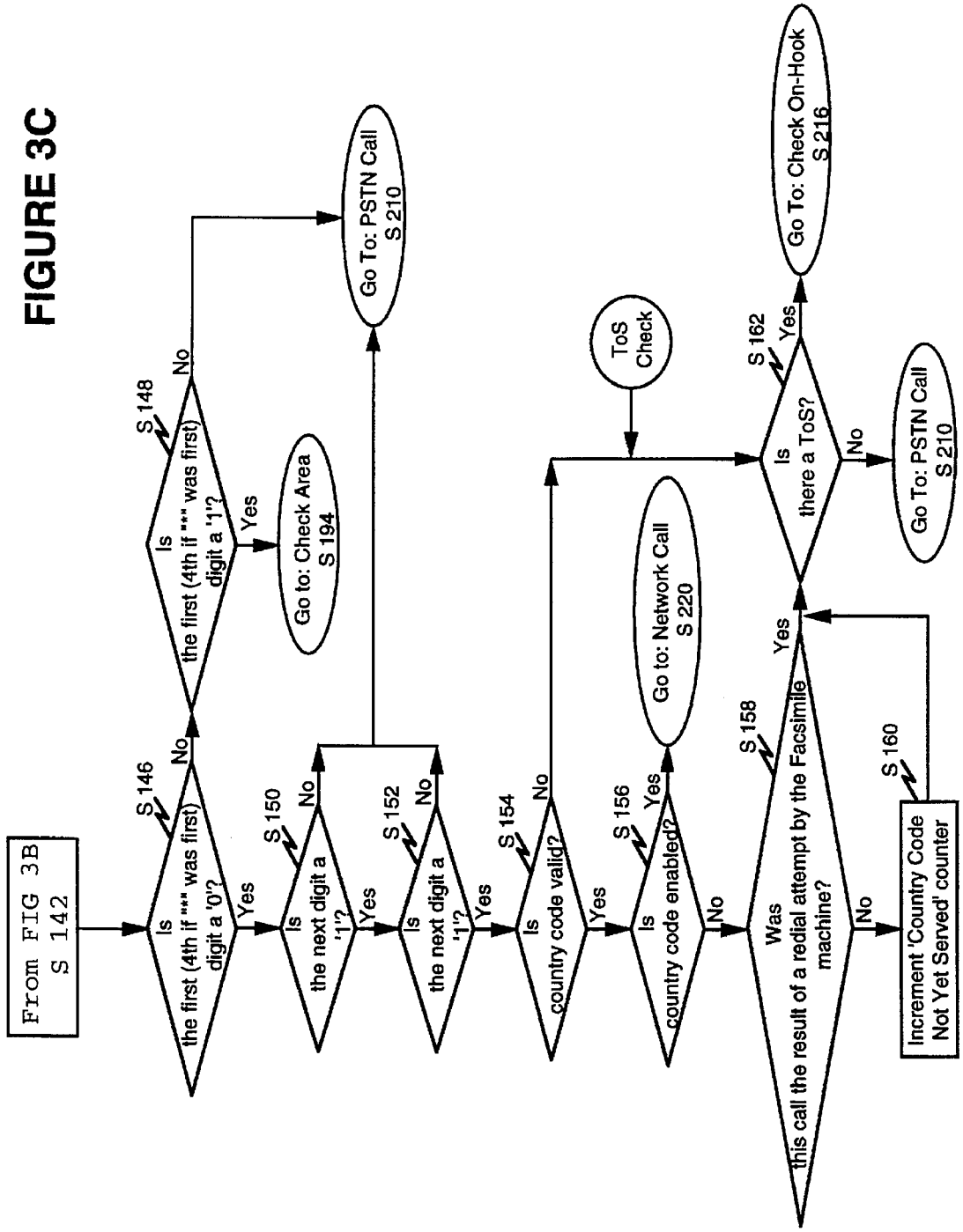
Figure 4:
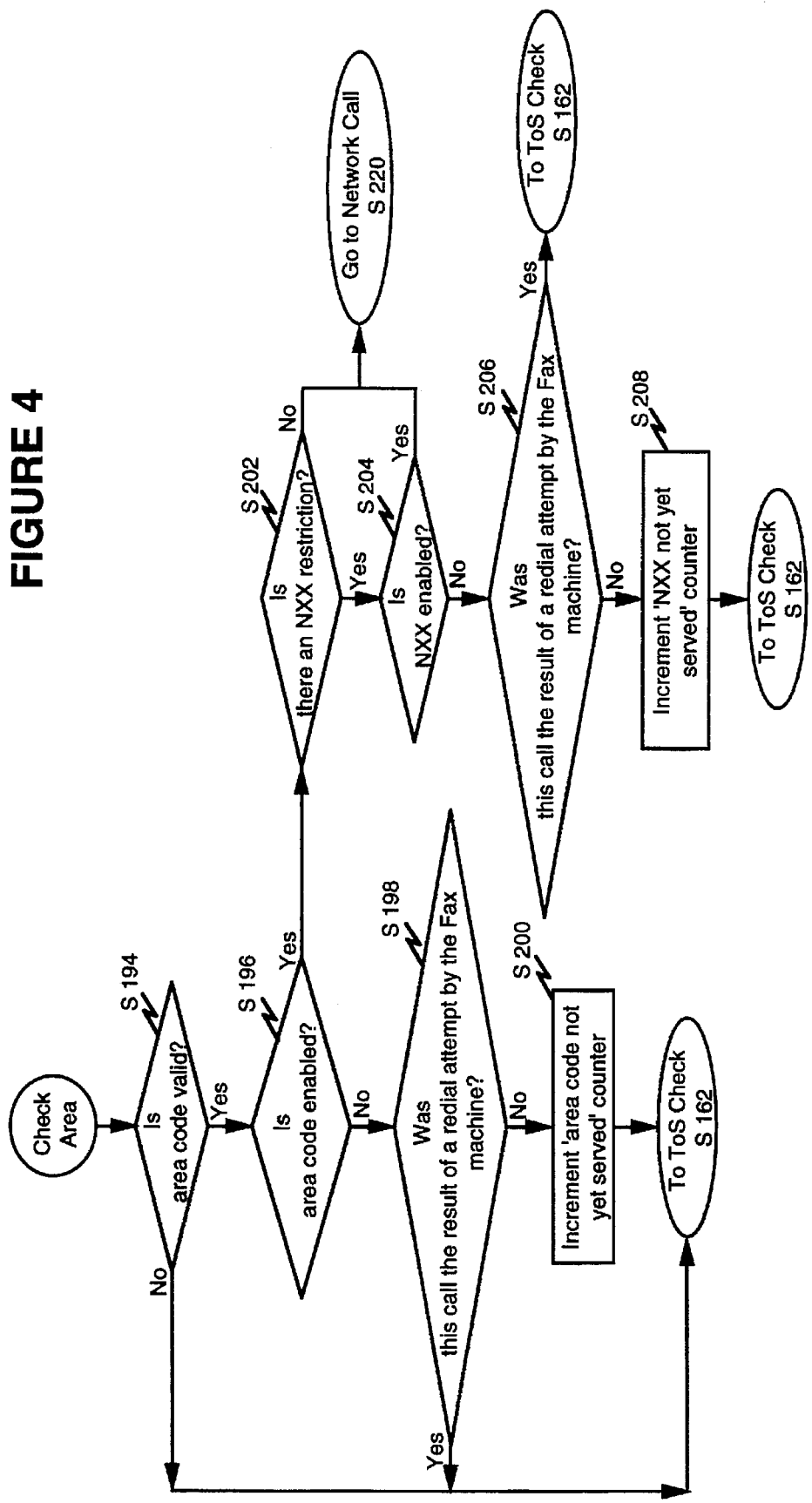
FIGS. 4, 4A, 4B, 4C, 4D and 4E are a flow chart showing amongst others, the call routing decision process.
Figure 4A:
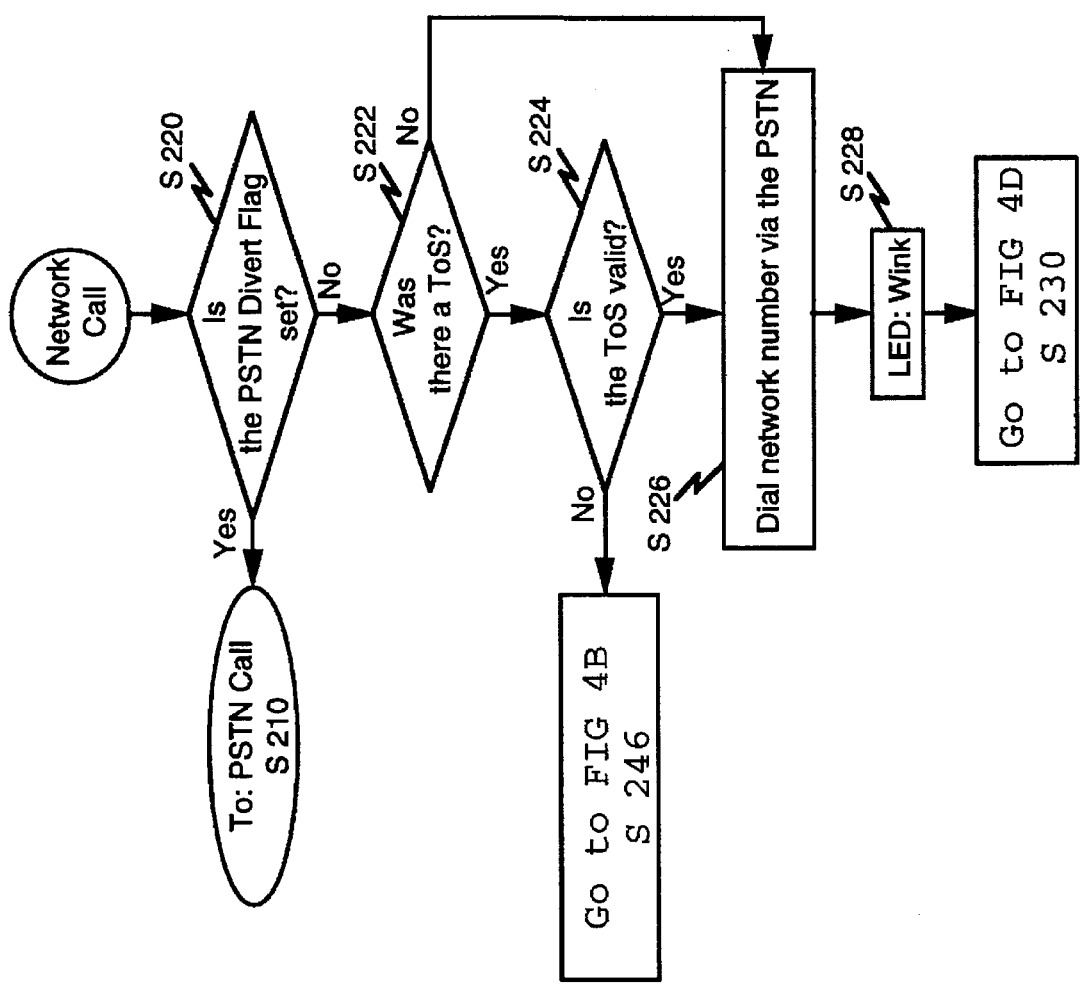
Figure 4B:
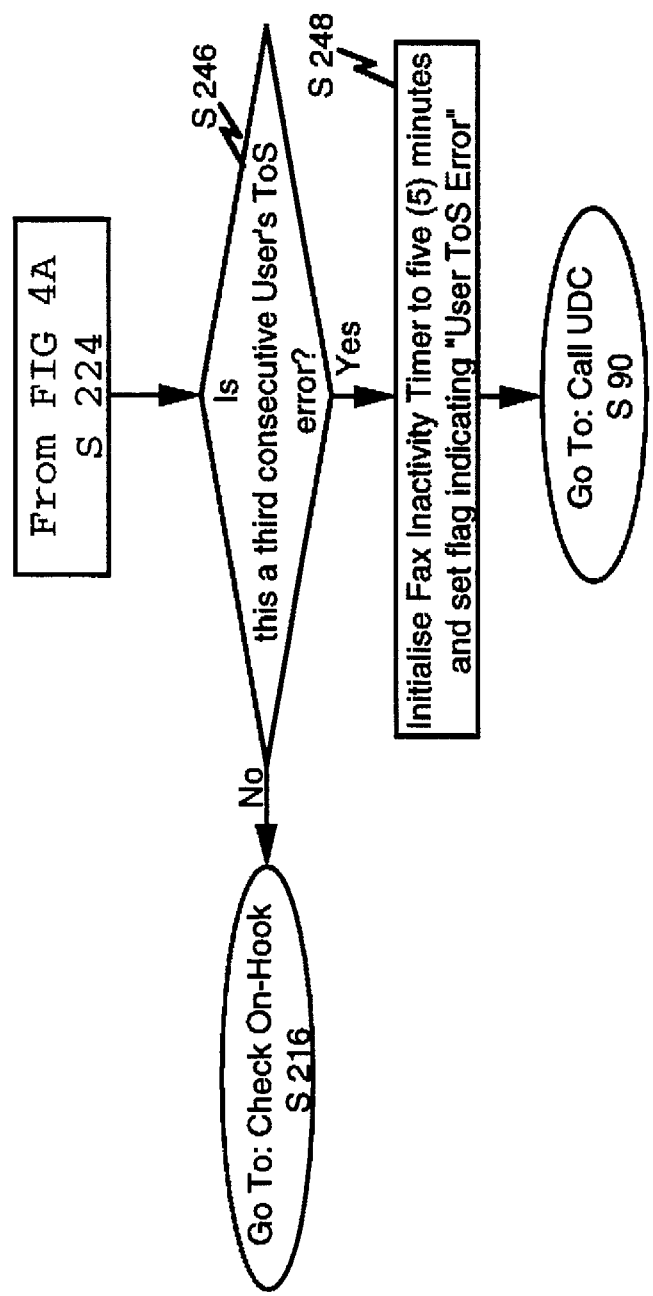
Figure 4C:
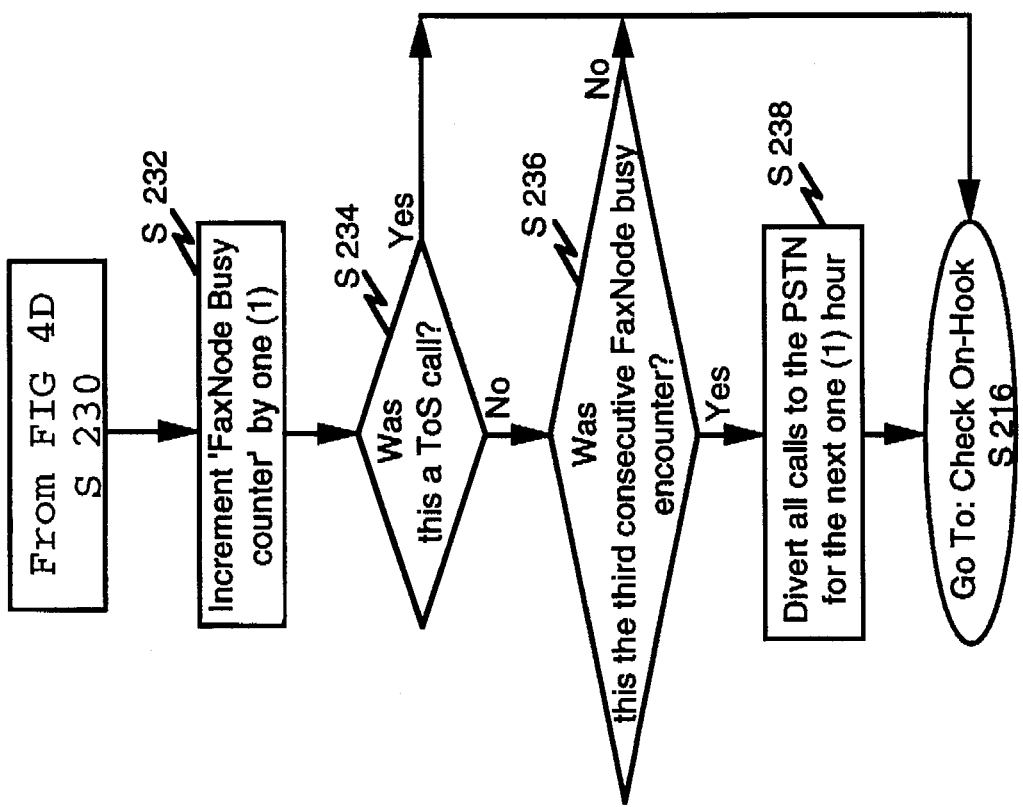
Figure 4D:
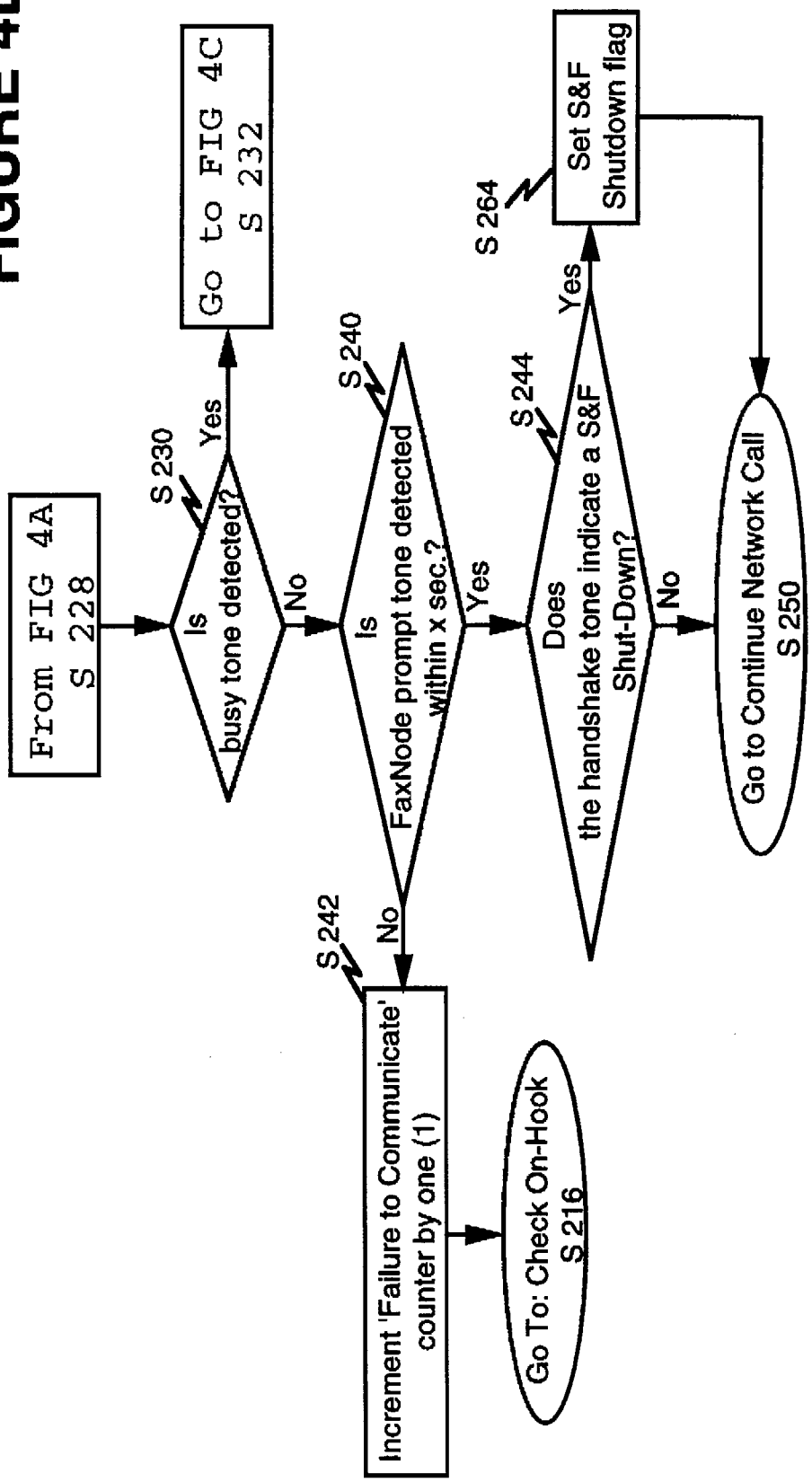
Figure 4E:
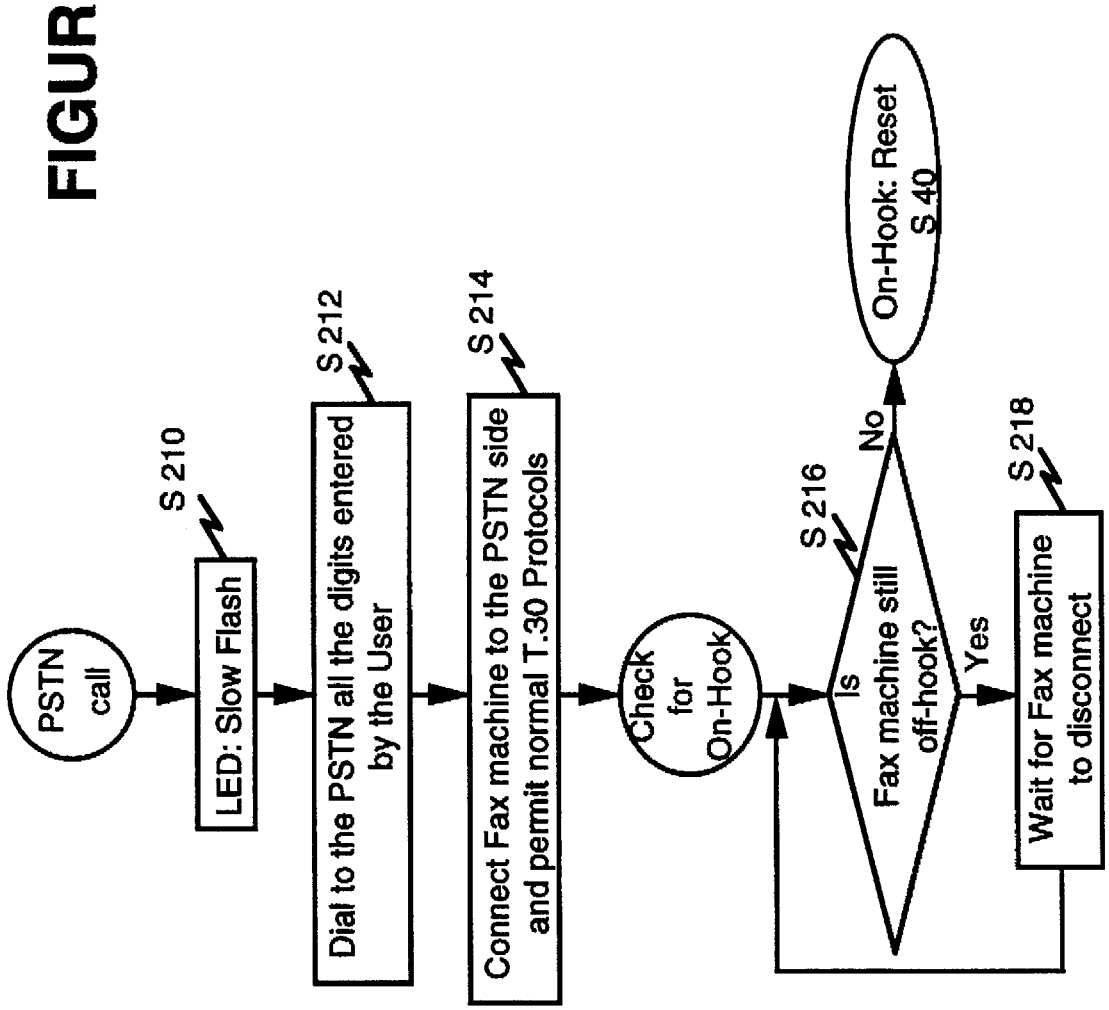
Figure 5:
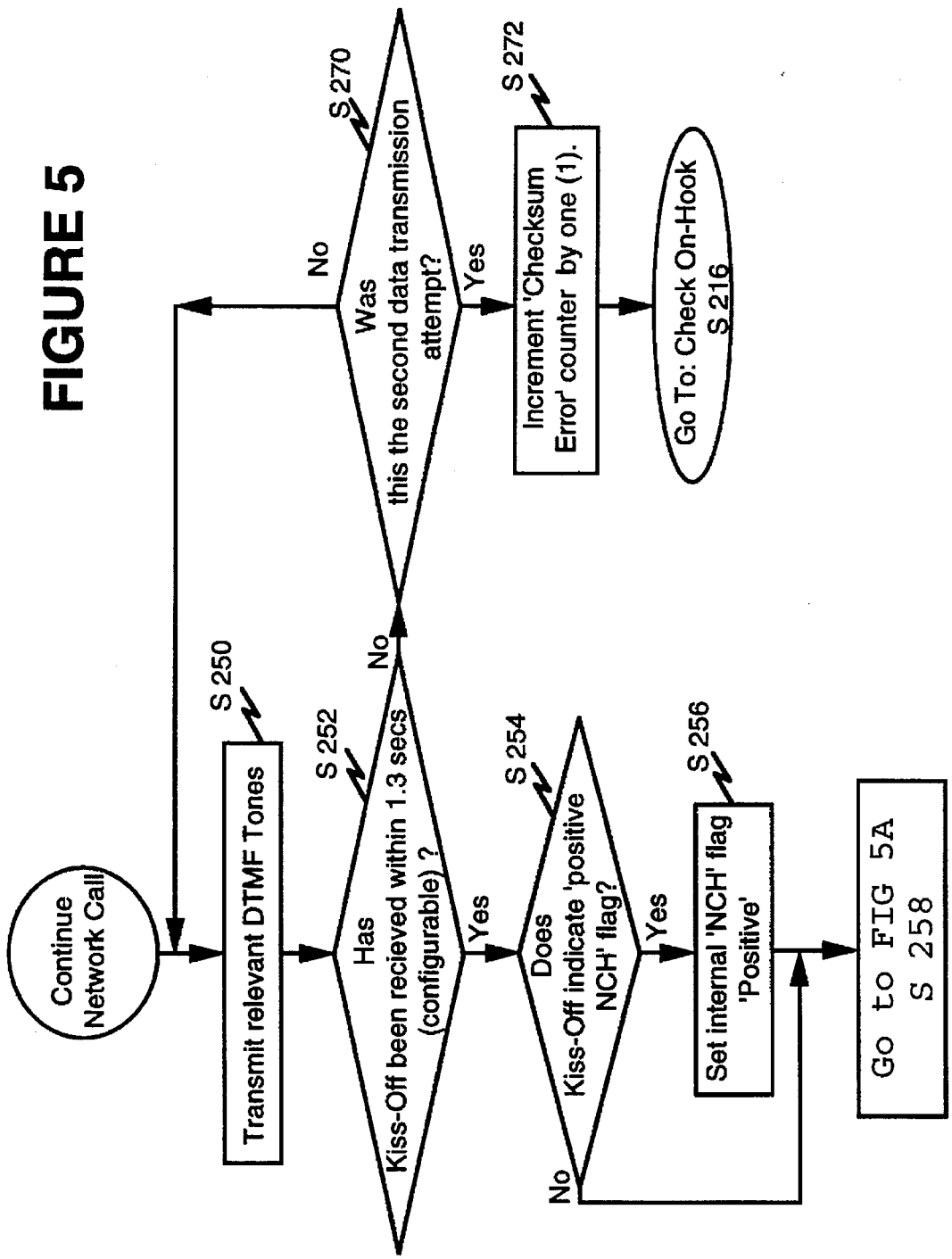
FIGS. 5, 5A and 5B are a flow chart showing amongst others, the call diversion to store-and-forward facilities process.
Figure 5A:
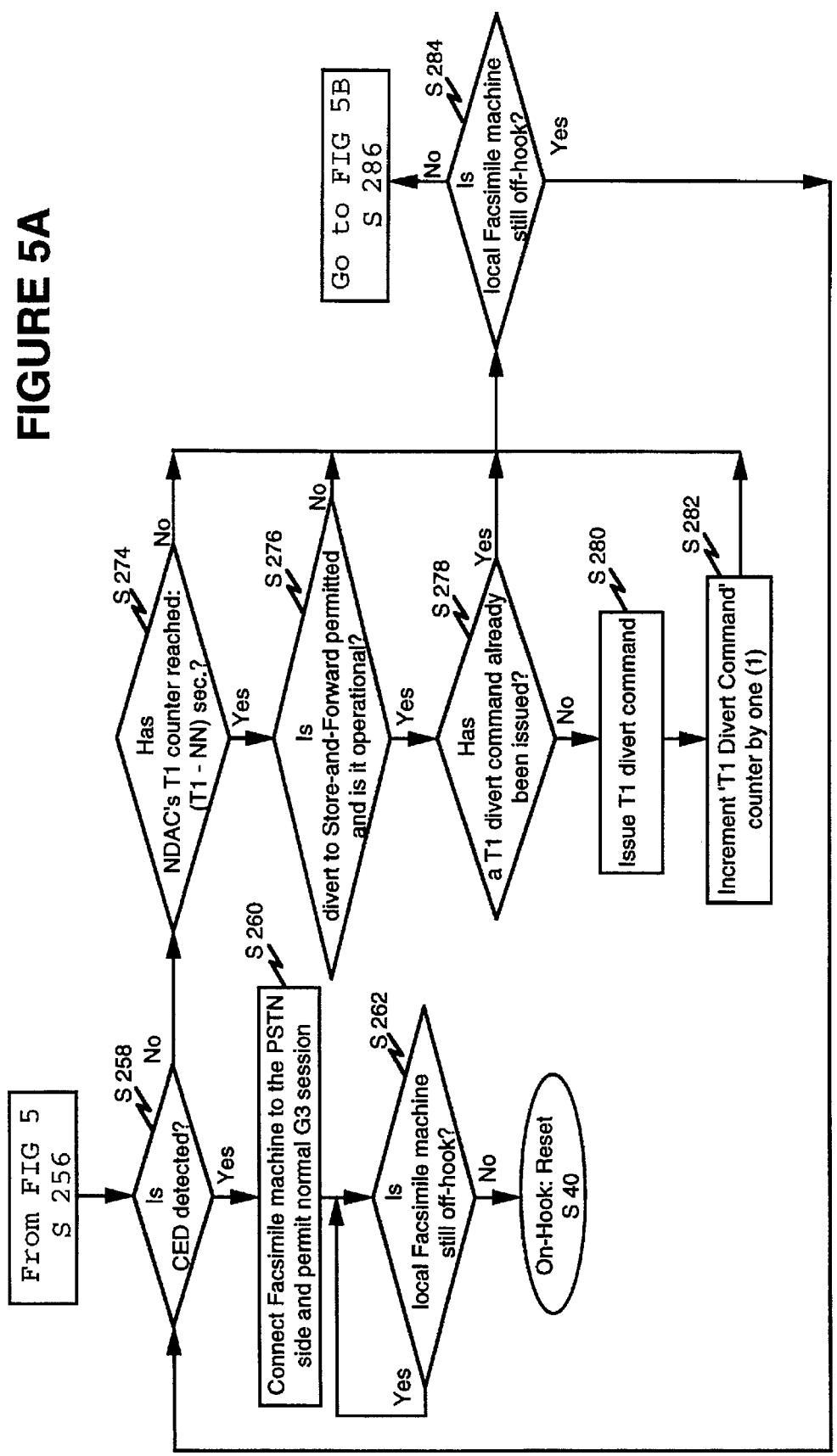
Figure 5B:
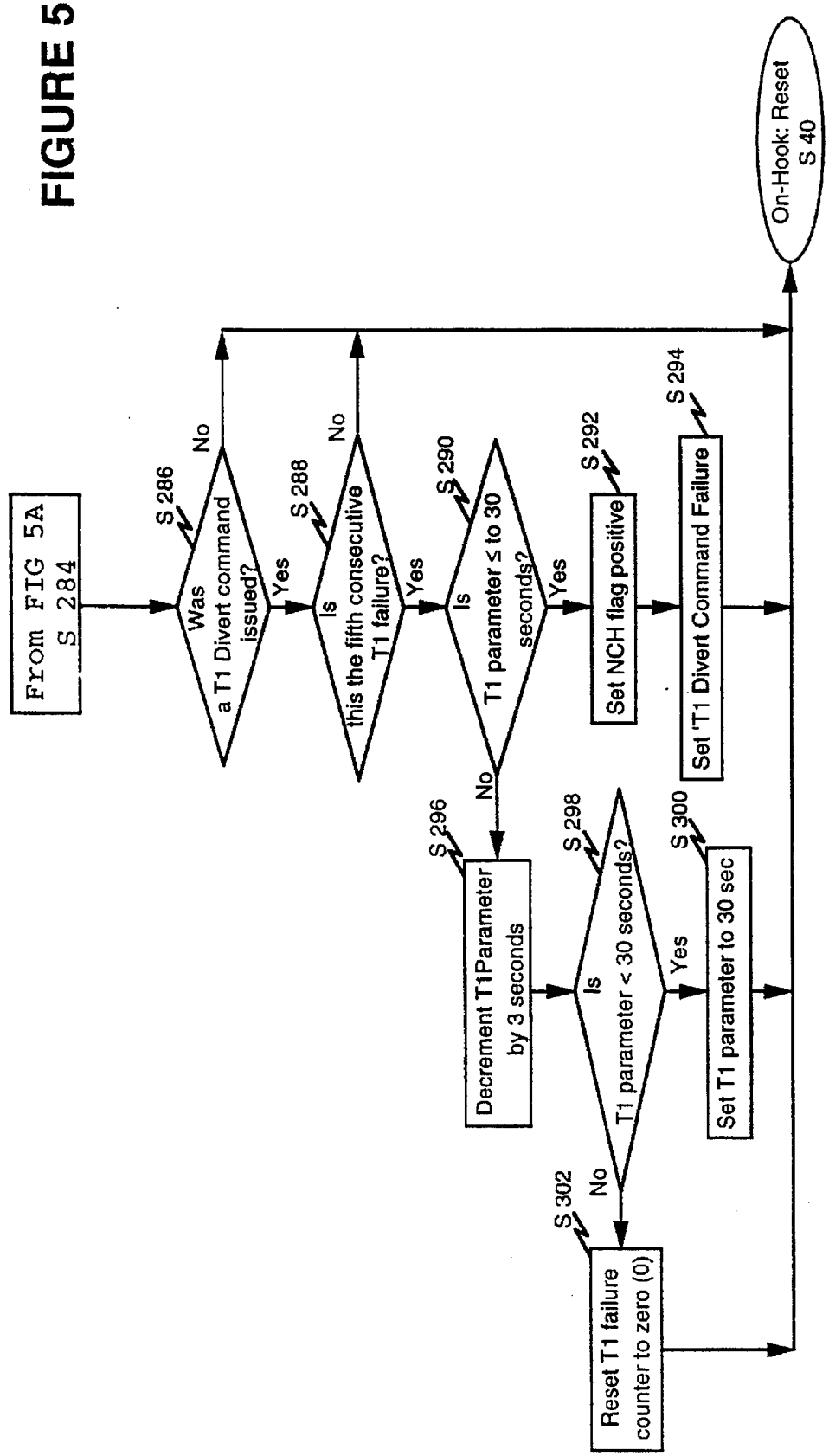

Step S182 stores the end value for the T1 parameter in a location in data-memory 14. The program flow then returns to re-start at step S40 (FIG. 2).

Step S184 deletes the last value for the T1 parameter from the controller's RAM without storing it, and leaves an indicator flag set to show that the T1 parameter has not been successfully captured.

Step S186 judges if this was the third unsuccessful attempt at measuring the T1 parameter. If yes, flow proceeds to step S188. If not, flow proceeds to S216.

Step S188 increments a "T1 Measurement Attempt Failure" counter, a program within the program memory, by one (1).

In step S190, the controller waits to detect the return of the facsimile to an on-hook condition. Once detected, the on-hook condition is then signalled on line 34a by the on-hook-detector 34. When back on-hook, flow proceeds to step S192.

Step S192 sets up a counter timer to check for 5 minutes of non-activity by the facsimile.

Flow then proceeds back to step S90 to wait for the "Non-Activity Time" to expire. Following expiration, it then calls the UDC to report the failure status of the T1 parameter measurement.

For the check of the area code, Step S194 judges if the next three (3) digits following the digit tested in step S148, represent a valid area code. If yes, flow proceeds to step S196. If not, flow proceeds to "Type of Service Check", step S162.

Step S196 judges if the valid area code is enabled, meaning that the call should be passed conditionally to the private network. If yes, flow proceeds to step S202. If not, to step S198.

Step S198 judges if the call is the result of a re-dial attempt. If yes, flow jumps directly to "Type of Service Check" at step S162. If not, flow advances first to step S200.

In step S200 the specific "Area Code Not Yet Served" counter is incremented by one (1). Flow then proceeds to "Type of Service Check", at step S162.

Step S202 judges if there is an NXX restriction. If yes, flow then proceeds to step S204. If not, flow proceeds to "Network Call", at step S220.

Step S204 judges if the NXX digits of the destination telephone number correspond to an NXX which is enabled. If yes, flow proceeds to "Network Call" at step S220. If not, flow proceeds to step S206.

Step S206 judges if the call is the result of a re-dial. If yes, flow jumps to "Type of Service Check", at step S162. If not, flow advances to step S208.

In step S208, the specific "NXX Not Yet Served" counter is incremented by one (1). Flow then proceeds to "Type of Service Check", at step S162.

When calling the PSTN, step S210 turns the LED indicator on to "SLOW FLASH" mode.

Step S212, employs the DTMF-Tone-CCT to dial on PSTN line all of the digits that were previously entered by the user, and which were stored in the controller's RAM (note that step S126 has already taken the PSTN line Off-Hook and checked for dial tone).

In step S214, the FSU switches the facsimile to the PSTN line, thus permitting normal T.30 protocols to proceed.

Step S216 judges if the facsimile is still off-hook. If yes, flow proceeds to step S218. If not, flow returns to step S40 for an on-hook reset.

In step S218, controller 10 waits for the facsimile to disconnect and then loops back to step S216 to verify the fax-off-hook-detector's status.

When placing a network call step S220 judges if the "PSTN Divert Flag" is set, thus indicating that a divert to PSTN order is still in effect. If yes, flow jumps to "PSTN Call" at step S210. If not, flow continues to step S222.

Step S222 judges if the number sequence captured in step S124 included a type of service request. If yes, flow proceeds to step S224. If not, flow jumps to step S226.

Step 224 judges if the type of service is valid. If yes, flow proceeds to step S226. If not, flow jumps to step S246.

In step S226, the network access number stored in data-memory 14 is dialled employing DTMF-Tone-CCT 28 on the PSTN line 8e.

Step S228 then turns the LED indicator ON in "Wink" mode.

Step S230 judges if a busy signal is detected at the central node. If yes, flow diverts to step S232. If not, flow proceeds to step S240.

Step S240 judges if the central node prompt tone is detected within a time previously programmed in data-memory 14. If yes, flow proceeds to step S244. If not, flow proceeds to step S242.

Step S242 increments the "Failure to Communicate" counter by one (1). Flow then returns to step S40 for an on-hook reset.

Step S244 judges if the central node's "Handshake/Prompt" tone indicates a store-and-forward shut-down condition. If yes, flow proceeds to step S264. If not, flow proceeds to "Continue Network Call" at step S250.

Step S264 sets a flag indicating that the network's store-and-forward facilities are down. The flow then proceeds to "Continue Network Call" at step S250.

Step S232 increments the "Faxnode Busy" counter by one (1). Flow then proceeds to step S234.

Step S234 judges if the digit sequence captured in step S124 included a type of service. If yes, the call is treated as invalid and flow proceeds to step S216. If not, flow advances to step S236.

Step S236 judges if this was the third consecutive "Fax-node Busy" encounter. If yes, flow proceeds to step S238. If not, flow proceeds to step S216.

Step S238 sets a "PSTN Divert Flag" and starts a timer to reset this flag after one (1) hour. Flow then proceeds to step S216.

Step S246 judges if the type of service request, judged not valid in step S224, was the third consecutive user type of service error. If yes, flow proceeds to step S248. If not, flow proceeds to step S216.

Step S248 abandons the call attempt, sets a flag to indicate that the third consecutive user type of service error has occurred, initializes the facsimile inactivity timer to five minutes, and flow then jumps to step S90 to place a call to the UDC.

Step S250 re-transmits the data string, and the "Check sum", to the central node.

Step S252 judges if a "Kiss-Off" tone has been received within a pre-programmed time. If yes, flow proceeds to step S254. If not, flow diverts to step S270.

Step S254 judges if the "Kiss-Off" tone received indicates that the NCH flag at the control apparatus should be set to Positive. If yes, flow proceeds to step S256. If not, flow skips ahead to step S258.

Step S256 sets the control apparatus' internal NCH flag positive, so that a call to the UDC will be set up at the appropriate point in the program flow (step S62).

Step S258 judges if a CED tone has been received from the network. If yes, flow proceeds to step S260. If not, flow diverts to step S274.

In step S260, the FSU switches the facsimile to PSTN line 8e through TLI 8, thus permitting normal T.30 protocols to proceed.

Step S262 judges if the facsimile is still off-hook. If yes, flow loops back to step S262 to verify the fax off-hook status. If still off-hook it waits for the facsimile to go back on-hook. If not, flow proceeds to step S40.

Step S270 (reached after a "No" judgment at step S252) judges if this was the second data transmission attempt without receipt of a "Kiss-Off". If yes, flow proceeds to step S272. If not, flow loops back to step S250 to retransmit a second time.

In step S272, the controller increments the "Checksum Error" counter by one (1). Flow then proceeds to step S216.

Step S274 (reached after a "No" judgment at step S258) judges if the T1 counter has reached the point (T1–NN seconds) where a "Divert to Store-and-Forward" command to the faxnode should be issued. If yes, flow proceeds to step S276. If not, flow advances to step S284 (Note: NN is a preprogrammed parameter that accounts for the time that it takes a faxnode to divert an attempted Real-Time call to Store-and-Forward facilities).

Step S276 judges if a "Divert to Store-and-Forward" command is permitted by the user's either default or current type of service. If yes, flow proceeds to step S278. If not, flow skips ahead to step S284.

Step S278 judges if a "T1 Divert" command has already been issued for this call (due to previous program flow via steps S274 through S284). If yes, flow advances to step S284. If not, flow proceeds to step S280.

In step S280 controller 10 transmits the "T1 Divert" command DTMF tone to the node.

In step S282, the controller increments the T1 divert command" counter by one (1). Flow then continues to step S284.

Step S284 judges if facsimile is still off-hook. If yes, flow loops back to step S258 to test for a CED tone from the destination facsimile. Until a CED is received or, if not received, until step S274 judges that the (T1–NN) time has expired, flow remains in a loop which flows from S284, to S258 to S274 and back to S284. If in S284 it was determined that the facsimile went back off-hook, flow will then proceed to step S286.

Step S286 judges if a T1 divert command has been issued (due to program flow via step S280). If yes, flow proceeds to step S288. If not, flow skips past step S288, and then returns to step S40 for an on-hook reset.

Step S288 judges if this is the fifth consecutive T1 failure. If yes, flow proceeds to step S290. If not, flow proceeds directly to step S40 for an on-hook reset.

Step S290 judges if the T1 parameter is less than or equal to 30 seconds. If yes, flow proceeds to step S292. If not, flow proceeds to step S296.

In the step S292, the NCH flag is set to positive, so that a call to the UDC will be set up at the appropriate point in the program flow (step S62).

Step S294 sets a "T1 Divert Command Failure" flag, so that the T1 failure problem will be reported during the next call to the UDC. Flow then returns to step S40 for an on-hook reset.

Step S296 decrements the T1 parameter value by 3 seconds, since the 5 consecutive T1 failures, judged in step S288, indicate that the currently stored T1 parameter value is likely too long when compared to the actual T1 of the facsimile.

Step S298 judges if the T1 parameter is now less than 30 seconds after the 3 seconds reduction in step S296. If yes, flow proceeds to step S300. If not, flow proceeds to step S302.

Step S300 sets the T1 parameter value to 30 seconds, and flow then returns to step S40 for an on-hook reset.

Step S302 resets the "T1 failure" counter to zero (0), so that this counter can be used to judge future performance with the new, reduced, T1 parameter value. Flow then returns to step S40 for an on-hook Reset.

Thus, it is apparent that there has been provided in accordance with the invention a telecommunications management and control apparatus that fully satisfies the objects, aims and advantages set forth above. While the invention has been described in conjunction with (a) specific embodiment(s) thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A data communication control apparatus for use in association with a facsimile transmission device, comprising:

a memory means for storage of telephone number data, private telephone network protocol information and telephone line data;

an off-hook detector means for determining when the facsimile device is placing an outgoing call;

a control means for controlling the outgoing call in response to an instruction from said off-hook detector means, said control means comparing the telephone number of the outgoing call with the telephone number data in the memory means and determining whether that number is served by a private telephone network; and fax-tone detector means, to be used in association with the off-hook detector and memory means, for determining a time-out period of the facsimile device placing the outgoing call; wherein when the outgoing call is placed by the facsimile device, said off-hook detector instructs said control means which first determines whether or not the outgoing call is a long distance number and, if so, whether the long distance area code, or country code is serviced by the private telephone network and, if so determined, the call is diverted to said private telephone network where if the call is not connected to the destination facsimile device within the determined time-out period of the originating facsimile device, the call is optionally diverted to the private telephone network's store and forward facility.

2. A data communication control apparatus according to claim 1 also comprising a decoder for determining whether the telephone number dialled was dialled manually or using a speed dial feature of the facsimile transmission device for statistical analysis of a user's calling patterns.

3. A data communication control apparatus according to claim 1 further comprising a remote programming means for programming said control means, wherein said programming means is accessible only through a computer link established by an outgoing call placed to a service facility by the control apparatus.

4. A data communication control apparatus according to claim 3 wherein the control apparatus places a call to the service facility when statistics buffers of the control apparatus are at a predetermined capacity for uploading of statistics, routing tables and programmable parameters, and selective reprogramming of routing tables and programmable parameters, if necessary.

5. A data communication control apparatus according to claim 3 wherein the control apparatus places a call to the service facility in response to a facsimile network instruction tone sent to the control apparatus by the private network to safeguard against unauthorized access or tampering.

6. A data communication control apparatus according to claim 1 further comprising a means for tracking user statistics of the control apparatus to assist a service provider in planning and optimizing the private network.

* * * * *